United States Patent
Sudoh

(10) Patent No.: US 9,195,036 B2
(45) Date of Patent: Nov. 24, 2015

(54) ZOOM LENS, CAMERA, AND PORTABLE INFORMATION DEVICE

(71) Applicant: Yoshifumi Sudoh, Tokyo (JP)

(72) Inventor: Yoshifumi Sudoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/445,408

(22) Filed: Jul. 29, 2014

(65) Prior Publication Data

US 2015/0043087 A1    Feb. 12, 2015

(30) Foreign Application Priority Data

Aug. 9, 2013   (JP) .................... 2013-167165
Aug. 22, 2013  (JP) .................... 2013-172747

(51) Int. Cl.
    *G02B 15/14* (2006.01)
    *G02B 15/17* (2006.01)
    *G02B 27/42* (2006.01)

(52) U.S. Cl.
    CPC ............ *G02B 15/14* (2013.01); *G02B 15/17* (2013.01); *G02B 27/4211* (2013.01)

(58) Field of Classification Search
    CPC ..... G02B 15/14; G02B 15/17; G02B 27/4211
    USPC ................................................ 359/683, 688
    See application file for complete search history.

(56) References Cited

U.S. PATENT DOCUMENTS

| | | |
|---|---|---|
| 2007/0201144 A1 | 8/2007 | Sudoh |
| 2007/0247726 A1 | 10/2007 | Sudoh |
| 2008/0278779 A1 | 11/2008 | Nishina et al. |
| 2009/0067060 A1 | 3/2009 | Sudoh |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2009/0323200 A1 | 12/2009 | Sudoh |
| 2010/0027136 A1 | 2/2010 | Ohashi et al. |

(Continued)

FOREIGN PATENT DOCUMENTS

| | | |
|---|---|---|
| JP | 2000-221402 | 8/2000 |
| JP | 2003-287678 | 10/2003 |

(Continued)

OTHER PUBLICATIONS

U.S. Appl. No. 14/207,720, filed Mar. 13, 2014.

(Continued)

*Primary Examiner* — Scott J Sugarman
(74) *Attorney, Agent, or Firm* — Oblon, McClelland, Maier & Neustadt, L.L.P.

(57) ABSTRACT

A zoom lens includes, in order from an object side, a first lens unit having a positive refractive power, a second lens unit having a negative refractive power, a third lens unit having a negative refractive power, and a fourth lens unit having a positive refractive power. During change of magnification from the short focal end to the long focal end, the first lens unit is stationary, the second lens unit is moved to an image side, the third lens unit is moved, and the fourth lens unit is stationary. A positive lens, included in the fourth lens unit or the first lens unit, satisfies the condition formulas: $1.40 < n_d < 1.65$; $65.0 < v_d < 100.0$; and $0.015 < P_{g,F} - (-0.001802 \times v_d + 0.6483) < 0.060$, and the first lens unit includes a diffraction plane and satisfies the condition formula: $50 < fdoe/f1 < 200$.

20 Claims, 18 Drawing Sheets

(56) References Cited

U.S. PATENT DOCUMENTS

| | | |
|---|---|---|
| 2010/0123957 A1 | 5/2010 | Miyano |
| 2010/0271710 A1 | 10/2010 | Ohashi |
| 2010/0296180 A1 | 11/2010 | Sudoh et al. |
| 2011/0043927 A1 | 2/2011 | Sudoh |
| 2011/0051260 A1 | 3/2011 | Nakayama et al. |
| 2011/0069402 A1 | 3/2011 | Sudoh |
| 2011/0222169 A1 | 9/2011 | Sudoh |
| 2011/0228408 A1 | 9/2011 | Sudoh |
| 2012/0127586 A1 | 5/2012 | Sudoh |

FOREIGN PATENT DOCUMENTS

| | | |
|---|---|---|
| JP | 2006-084971 | 3/2006 |
| JP | 2008-197534 | 8/2008 |
| JP | 2009-098419 | 5/2009 |
| JP | 2011-170054 | 9/2011 |
| JP | 2012-185272 | 9/2012 |

OTHER PUBLICATIONS

The Extended European Search Report issued Dec. 1, 2014, in Application No. / Patent No. 14179378.6-1562.

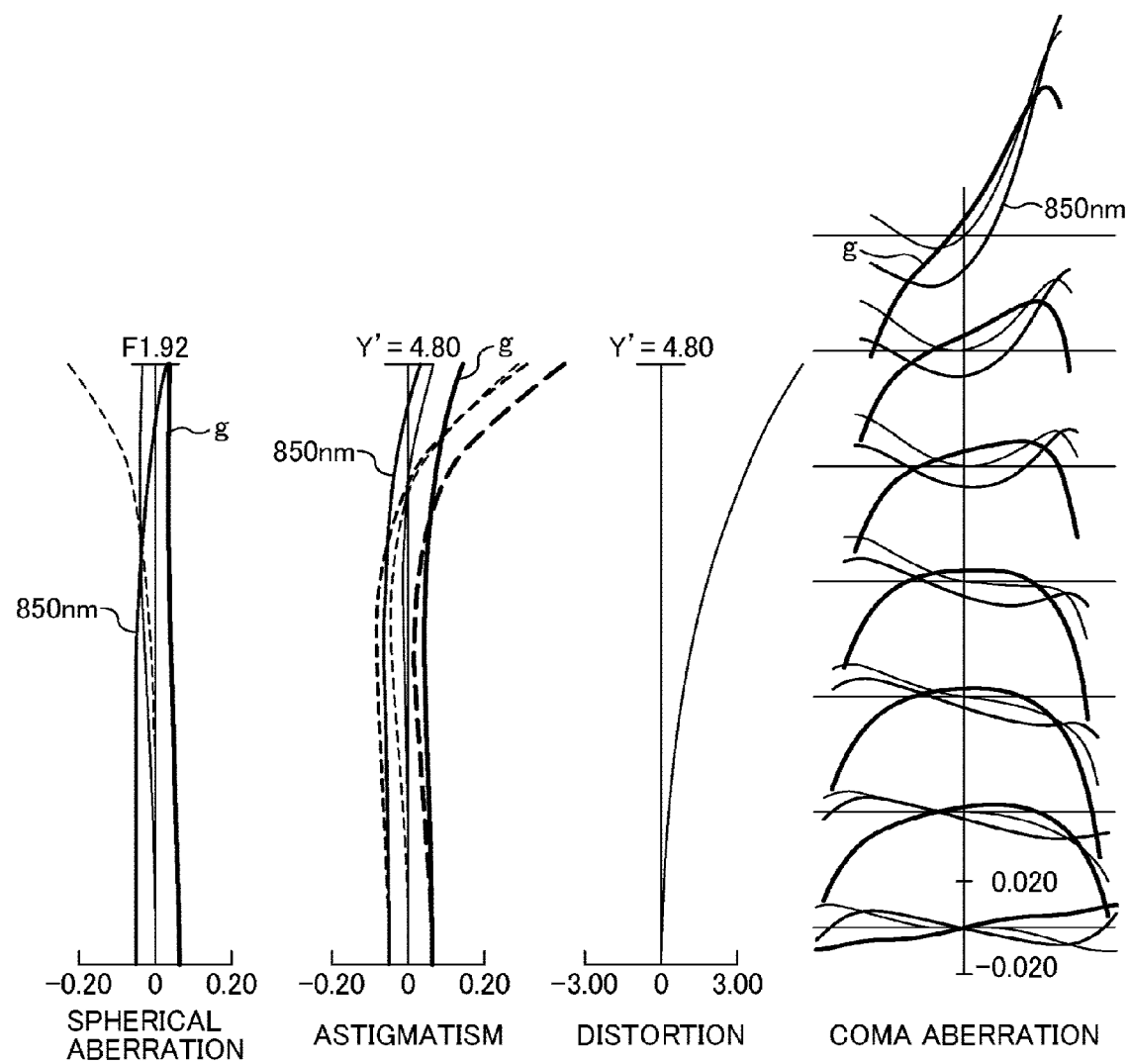

ZOOM LENS, CAMERA, AND PORTABLE INFORMATION DEVICE

CROSS-REFERENCE TO RELATED APPLICATIONS

This patent application is based on and claims priority pursuant to 35 U.S.C. §119(a) to Japanese Patent Application Nos. 2013-167165, filed on Aug. 9, 2013, and 2013-172747, filed on Aug. 22, 2013, in the Japan Patent Office, the entire disclosure of which is hereby incorporated by reference herein.

BACKGROUND

1. Technical Field

The present invention relates to a zoom lens, and more particularly to, a zoom lens having a diffraction plane, a camera having the zoom lens, and a portable information device having the zoom lens.

2. Description of the Related Art

Market of cameras used for security and the like are widened, and demands are also increased in various fields. Among the demands, high image quality and high magnification changeability are desired by users, and weight thereof is large. Therefore, even in the zoom lens used as a photographing lens, the reconciliation of high performance with high magnification changeability is often required.

In terms of high performance, a configuration having a resolving power corresponding to imaging elements of at least 1 mega to 5 mega pixels over the entire zoom range is desired. In addition, it is considered that a magnification changing ratio of about X16 is preferred as the high magnification changeability.

It is also preferable that aberrations be sufficiently corrected even in a near infrared wavelength range so that photographing is available even in a dark state.

In addition, widening of an angle of view is also preferred, and preferably, a half angle of view at a short focal end of a zoom lens is 25 degrees or more.

In addition, large-diameter of a lens is also preferred, and preferably, an F number at a short focal end (sometimes, referred to as "wide angle") is 2.0 or less.

SUMMARY

In view of the above, an object of the present invention is to provide a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels.

For example, the zoom lens includes, in order from an object side: a first lens unit having a positive refractive power; a second lens unit having a negative refractive power; a third lens unit having a negative refractive power; and a fourth lens unit having a positive refractive power. During a change of magnification from the short focal end to the long focal end, the first lens unit is stationary, the second lens unit is moved to an image side, the third lens unit is moved, and the fourth lens unit is stationary. The fourth lens unit includes a 4a-th lens unit which is arranged at the object side from a position having the largest interval in the fourth lens unit and a 4b-th lens unit which is arranged at the image side. The 4a-th lens unit includes a positive lens satisfying the following condition formulas (1), (2), and (3). The first lens unit includes a diffraction plane and satisfies the following condition formula (4).

$$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

$$50 < fdoe/f1 < 200 \quad (4)$$

where $n_d$ denotes a refractive index of the positive lens, $v_d$ denotes an Abbe number of the positive lens, $P_{g,F}$ denotes a partial dispersion ratio of the positive lens, fdoe is a focal length of the diffraction plane, and f1 denotes a focal length of the first lens unit, and wherein refractive indexes of g-line, F-line, and c-line of the positive lens are denoted by $n_g$, $n_F$, and $n_c$, respectively, the partial dispersion ratio $P_{g,F}$ is expressed by:

$$P_{g,F} = (n_g - n_F)/(n_F - n_C).$$

In another example, the zoom lens includes, in order from an object side: a first lens unit having a positive refractive power; a second lens unit having a negative refractive power; a third lens unit having a negative refractive power; and a fourth lens unit having a positive refractive power. During a change of magnification from the short focal end to the long focal end, the first lens unit is stationary, the second lens unit is moved to an image side, the third lens unit is moved, and the fourth lens unit is stationary. The first lens unit is includes, in order from the object side, a negative lens L11, a positive lens L12, and a positive lens L13, The positive lens L13 in the first lens unit satisfies the following condition formulas (1), (2), and (3), and the first lens unit includes a diffraction plane and satisfies the following condition formula (4).

$$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

$$50 < fdoe/f1 < 200 \quad (4)$$

where $n_d$ denotes a refractive index of the positive lens L13, $v_d$ denotes an Abbe number of the positive lens L13, $P_{g,F}$ denotes a partial dispersion ratio of the positive lens L13, fdoe is a focal length of the diffraction plane, and f1 denotes a focal length of the first lens unit, and wherein $P_{g,F} = (n_g - n_F)/(n_F - n_c)$ where $n_g$, $n_F$, and $n_c$ denote refractive indexes of g-line, F-line, and c-line of the positive lens L13, respectively.

BRIEF DESCRIPTION OF THE SEVERAL VIEWS OF THE DRAWINGS

FIG. 1A is a cross-sectional diagram at a short focal end (wide-angle end) along an optical axis, FIG. 1B is a cross-sectional diagram at an intermediate focal length along the optical axis, and FIG. 1C is a cross-sectional diagram at a long focal end (telephoto end) along the optical axis;

FIG. 4 is an aberration graph illustrating spherical aberration, astigmatism, distortion aberration, and comatic aberration at the long focal end (telephoto end) of the zoom lens according to Example 1 of the present invention illustrated in FIGS. 1A to 1C;

FIG. 5A is a cross-sectional diagram at a short focal end along an optical axis, FIG. 5B is a cross-sectional diagram at an intermediate focal length along the optical axis, and FIG. 5C is a cross-sectional diagram at a long focal end along the optical axis.

FIG. 9A is a cross-sectional diagram at a short focal end along an optical axis, FIG. 9B is a cross-sectional diagram at an intermediate focal length along the optical axis, and FIG. 9C is a cross-sectional diagram at a long focal end along the optical axis;

FIG. 13A is a cross-sectional diagram at a short focal end along an optical axis, FIG. 13B is a cross-sectional diagram at an intermediate focal length along the optical axis, and FIG. 13C is a cross-sectional diagram at a long focal end along the optical axis;

DETAILED DESCRIPTION OF THE INVENTION

Figure 1A:
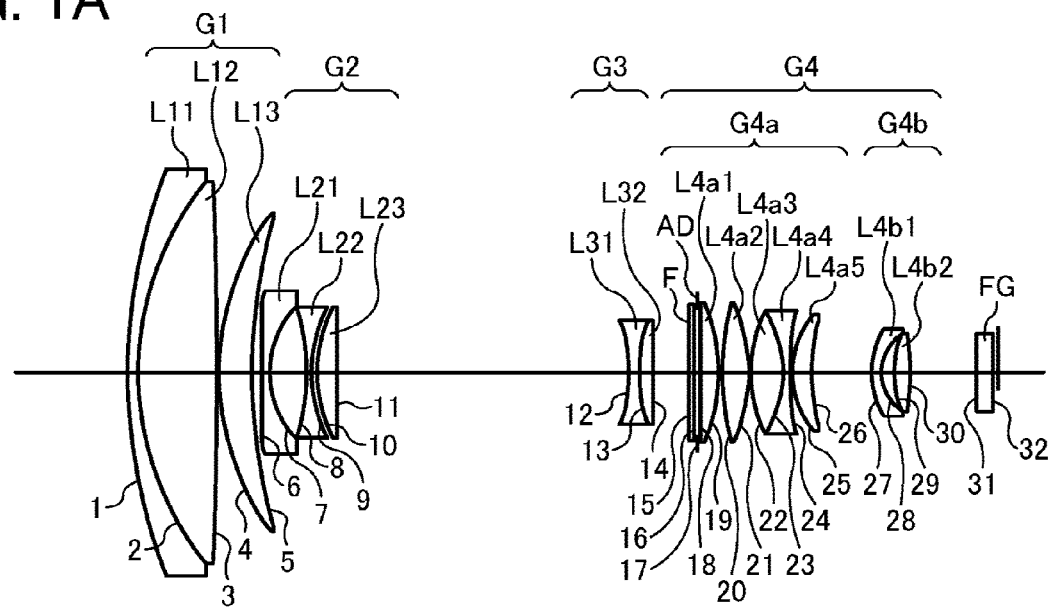
FIGS. 1A, 1B, and 1C are schematic diagrams illustrating a configuration of an optical system and a zoom locus involved with zooming of a zoom lens according to Example (numerical example; hereinafter the same is applied) 1 of a first embodiment of the present invention.

Hereinafter, zoom lenses, cameras, and portable information devices according to embodiments of the present invention will be described in detail with reference to the drawings.

Before description of specific examples, firstly, an elementary embodiment of the present invention will be described.

In the present invention, a first lens unit having a positive refractive power, a second lens unit having a negative refractive power, a third lens unit having a negative refractive power, and a fourth lens unit having a positive refractive power are arranged in order from an object side. In other words, a zoom lens configured with four lens units of positive-negative-negative-positive lens units is configured as so-called a variator where the second lens unit performs a main magnification changing function.

During a change of magnification from the short focal end to the long focal end, the first lens unit is stationary, the second lens unit is moved to the image side, the third lens unit is moved, and the fourth lens unit is stationary, so that the distance between the first lens unit and the second lens unit is increased and the distance between the second lens unit and the third lens unit is decreased. In addition, in order to correct chromatic aberration in a near infrared wavelength range, it is preferable that a diffraction plane be used. If the diffraction plane is used for the first lens unit, correction of axial chromatic aberration at the long focal end is very effectively performed. In order to correct the axial chromatic aberration at the long focal end, it is preferable that the following conditions be satisfied.

First, in many cases of correcting the axial chromatic aberration at the long focal end by using a lens, an optical material having an abnormal dispersion property is used for the first lens unit. Therefore, the number of lens constituents of the first lens unit is increased, and as a result, the size of the lens becomes large. In addition, the optical material having an abnormal dispersion property has a large change in refractive index according to temperature and a large linear expansion coefficient, and if the number of optical materials used is large, there is a new problem in that large influence of the change in temperature on the performance at the long focal end occurs.

If the diffraction plane is simply used for the first lens unit, the axial chromatic aberration at the short focal end may not be corrected. With respect to a large-diameter zoom lens like the present invention, the axial chromatic aberration at the short focal end needs to be sufficiently corrected. Therefore, an optical material satisfying the below-described condition formulas (1), (2), and (3) may be used for the below-described 4a-th lens unit where an axial marginal ray of light passes through a high position even at the short focal end.

The optical material has a so-called abnormal dispersion property, and it may sufficiently correct the axial chromatic aberration at the short focal end.

Namely, the zoom lens further has the following characteristics.

First, the fourth lens unit is configured so that a 4a-th lens unit is arranged at the object side from the position having the largest interval in the fourth lens unit, and a 4b-th lens unit is arranged at the image side.

When a refractive index of a positive lens included in the 4a-th lens unit is denoted by $n_d$, an Abbe number of the positive lens is denoted by $\nu_d$, a partial dispersion ratio of the positive lens is denoted by $P_{g,F}$, a focal length of a diffraction plane is denoted by fdoe, a focal length of the fourth lens unit is denoted by f1, refractive indexes of the positive lens with respect to g-line, F-line, and c-line are denoted by $n_g$, $n_F$, and $n_c$, respectively, the partial dispersion ratio $P_{g,F}$ of the positive lens is expressed by:

$$P_{g,F}=(n_g-n_F)/(n_F-n_C).$$

Preferably, the positive lens in the first lens unit satisfies the following condition formulas (1), (2), and (3):

$$1.40<n_d<1.65 \quad (1)$$

$$65.0<\nu_d<100.0 \quad (2)$$

$$0.015<P_{g,F}-(-0.001802\times\nu_d+0.6483)<0.060 \quad (3)$$

A lens surface of any one of the lenses of the first lens unit has a diffraction plane, and the following condition formula (4) is satisfied.

$$50<fdoe/f1<200 \quad (4)$$

A focal length f of the diffraction plane is expressed by:

$$f=-1/(2\times C2).$$

Herein, C2 denotes a coefficient of a second-order term of a phase function.

If the condition formulas (1), (2), and (3) are satisfied, it is possible to sufficiently correct the axial chromatic aberration at the short focal end.

If the value is smaller than the lower limit of the condition formula (1), the monochromatic aberration is not sufficiently corrected. If the value is smaller than the lower limit of the condition formula (2), the chromatic aberration is not sufficiently corrected. If the value is smaller than the lower limit of the condition formula (3), the second spectrum of the chromatic aberration is not sufficiently corrected. On the other hand, no optical material exceeding the upper limits of all the condition formulas (1), (2), and (3) exists, and even if such an optical material exists, the optical material is very special, expensive, and unreal.

On the other hand, if the condition formula (4) is satisfied, it is possible to sufficiently correct the axial chromatic aberration at the long focal end. In addition, if the value is larger than the upper limit of the condition formula (4), the correction of the axial chromatic aberration at the long focal end according to the diffraction plane becomes too small, so that it may not be possible to sufficiently correct the chromatic aberration.

If the value is smaller than the lower limit of the condition formula (4), the axial chromatic aberration at the long focal end according to the diffraction plane is excessively corrected, the diffraction pitch becomes too small and, thus, processing becomes difficult, or flare greatly occurs.

More preferably, the following condition formula (4') may be satisfied.

$$100<fdoe/f1<150 \quad (4')$$

In order to achieve higher performance, the following condition formula (4'') may be satisfied.

$$50<fdoe/ft<150 \quad (4'')$$

If the condition formula (4') is satisfied, it is possible to sufficiently correct the axial chromatic aberration at the long focal end.

It is preferable that the two positive lenses in the 4a-th lens unit satisfy the condition formulas (1), (2), and (3).

The configuration of using the lens satisfying the condition formulas (1), (2), and (3) for the 4a-th lens unit is desired for correcting the axial chromatic aberration.

However, an optical material satisfying the condition formulas (1), (2), and (3) has a large change in refractive index according to temperature and a large linear expansion coefficient, and if the number of optical materials used is increased, an influence of the temperature on the performance occurs.

Therefore, in order to reconcile the axial chromatic aberration with the influence of temperature on the performance, the two positive lenses satisfying the condition formulas (1), (2), and (3) may be used for the 4a-th lens unit.

In addition, the first lens unit may be configured to include, in order from the object side, a negative lens L11, a positive lens L12, and a positive lens L13, and the positive lens L13 in the first lens unit may be configured to satisfy the above-described condition formulas (1), (2), and (3).

In order to achieve higher performance, the following condition formula (5) is satisfied.

$$0.20<Da/D4<0.35 \quad (5)$$

Herein, D4 denotes a thickness of the fourth lens unit, and Da denotes an air gap between the 4a-th lens unit and the 4b-th lens unit.

It is preferable that in the 4a-th lens unit and the 4b-th lens unit, exchange of aberration be large and a relatively large interval be secured in the fourth lens unit in a range satisfying the condition formula.

If the value is smaller than the lower limit of the condition formula (5), the interval between the 4a-th lens unit and the 4b-th lens unit becomes too small, and the correction of aberration of the 4a-th lens unit and the 4b-th lens unit is increased, so that it is difficult to correct the aberration. If the value is larger than the upper limit of the condition formula (5), the interval between the 4a-th lens unit and the 4b-th lens unit becomes too large, and the thickness of the 4a-th lens unit or the 4b-th lens unit becomes too small, so that it is difficult to correct the aberration.

In order to sufficiently correct the chromatic aberration and achieve high performance, the following condition formula (6) may be satisfied.

$$1.0<f4p/f4<3.0 \quad (6)$$

Herein, f4 denotes a focal length of the fourth lens unit, and f4p denotes the focal length of the positive lens satisfying the condition formulas (1), (2), and (3) in the 4a-th lens unit.

If the value is larger than the upper limit of the above-described condition formula, the focal length of the positive lens satisfying the condition formulas (1), (2), and (3) becomes too large, so that it may not be possible to sufficient obtain the effect of abnormal dispersion property and it may not be possible to sufficiently correct the axial chromatic aberration.

If the value is smaller than the lower limit of the condition formula (6), the focal length of the positive lens satisfying the condition formulas (1), (2), and (3) becomes too small, it is difficult to correct the monochromatic aberration.

The 4a-th lens unit may be configured to include, in order from the object side, a positive lens L4a1, a positive lens L4a2, a positive lens L4a3, a negative lens L4a4, and a positive lens L4a5, and the 4b-th lens unit may be configured to include, in order from the object side, a negative lens L4b1 and a positive lens L4b2.

In the 4a-th lens unit, since an axial marginal ray of light passes through a high position, the lens configuration of the large-diameter lens becomes important. Therefore, if the above-described configuration is made, it is possible to sufficiently correct the spherical aberration or the comatic aberration overall.

In addition, if the 4b-th lens unit is configured as described above, it is possible to appropriately set an exit pupil distance while correcting the aberration remaining in the 4a-th lens unit.

It is preferable that the number of lenses arranged in the 4a-th lens unit be larger than the number lenses arranged in the 4b-th lens unit.

In order to achieve higher performance, the following condition formula (7) may be satisfied.

$$0.2<(R1-R2)/(R1+R2)<0.4 \quad (7)$$

Herein, R1 denotes a radius of curvature of a first surface of the positive lens L4a1, and R2 denotes a radius of curvature of the negative lens L4b1.

The first surface of the positive lens L4a1 and the negative lens L4b1 may exchange aberration, and the above-described condition formula may be satisfied.

In order to achieve higher performance, the following condition formula (8) may be satisfied.

$$0.2<D4b/D4a<0.5 \quad (8)$$

D4a denotes a thickness of the 4a-th lens unit, and D4b denotes a thickness of the 4b-th lens unit.

If the value is larger than the upper limit of the above-described condition formula, the 4a-th lens unit becomes too thin, so that it is difficult to correct the aberration of the 4a-th lens unit where an axial marginal ray of light passes through a high position. If the value is smaller than the lower limit of the condition formula (8), the 4b-th lens unit becomes too thin, so that it is difficult to appropriately set an exit pupil distance while correcting the aberration remaining in the 4a-th lens unit.

Preferably, the following condition formula (8') may be satisfied.

$$0.25<D4b/D4a<0.35 \quad (8')$$

In order to achieve higher performance over the entire zoom range, it is preferable that the following condition formula (9) be satisfied.

$$0.10<f4/ft<0.25 \quad (9)$$

Herein, f4 denotes a focal length of the fourth lens unit, and ft denotes a focal length of the entire system at the long focal end.

If the condition formula (9) is satisfied, the fourth lens unit takes balance over the entire zoom range, so that it is possible to achieve correction of aberration over the entire zoom range.

When the light amount arriving on the image surface needs to be reduced, although the diameter of the stop may be configured to be decreased, it is preferable that the light amount be reduced by using an ND filter or the like without greatly changing the diameter of the stop in terms that the deterioration of the resolving power according to the diffraction phenomenon may be prevented.

It is preferable that focusing be performed by using the first lens unit.

In the case where focusing is performed by using the first lens unit, there is a merit in that the position of the first lens unit as a focusing unit is the same even in any zoom range. Particularly, in the case of photographing a moving picture, there is a merit in that focusing does not need to be performed again at the time of zooming.

It is preferable that a laminated-type diffraction optical element be used for the diffraction plane. If the optical elements having appropriate refractive index difference with respect to each wavelength are laminated, it is possible to increase diffraction efficiency over the wide wavelength range.

In addition, the laminated optical element may be configured to be in close contact with the lens surface. Furthermore, if the cemented surface of the lens is configured as a diffraction structure, it is possible to implement a robust configuration which may withstand an influence (disturbance) of the environment on the diffraction plane.

On the other hand, if the above-described zoom lens according to some example embodiments of the present invention is used as a photographing optical system or a moving picture photographing optical system, it is possible to configure a camera such as a so-called digital camera or a moving picture photographing camera (so-called a movie camera).

The camera is configured to include the above-described zoom lens as a photographing optical system, so that it is possible to implement a small-sized, high-image-quality camera having a magnification changing range capable of sufficiently covering a typical photographing range.

In addition, a photographing optical system of a so-called portable information device having a photographing function unit such as a camera function may be configured by using the above-described zoom lens.

The portable information device has a photographing function and is configured to include the above-described zoom lens as a photographing optical system, so that it is possible to provide a small-sized, high-image-quality portable information device having a magnification changing range capable of sufficiently covering a typical photographing range. Therefore, it is possible for a user to photograph a high-quality image with a portable information device having an excellent portability and to transmit the image to the outside.

As described above, according to an example, it is possible to provide a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels.

In an example, it is possible to correct the chromatic aberration well while suppressing the influence of change in temperature on the performance, so that it is possible to provide a high-performance zoom lens. Therefore, it is possible to implement a camera capable of obtaining good representation even in the case where there is a change in temperature while suppressing color blur over the entire screen.

In an example, since it is possible to provide a high-performance camera having better correction of aberrations, it is possible to implement a high-image-quality camera having a higher resolving power.

In an example, it is possible to correct the chromatic aberration well, so that it is possible to provide a high-performance zoom lens. Therefore, it is possible to implement a camera capable of obtaining good representation where color burr or the like over the entire screen is further suppressed.

In an example, since it is possible to provide a small-sized, high-image-quality camera where a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels is used as a photographing optical system, it is possible for a user to photograph a high quality image with a camera having an excellent portability.

In an example, it is possible to provide a small-sized camera having sufficient correction of aberration even in a near infrared wavelength rang and being capable of photographing a moving picture with a high image quality where a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, a small size, and a resolving power corresponding to imaging elements of 1 mega to 5 mega pixels is used as a photographing optical system of a camera function unit. Therefore, it is possible for a user to photograph a high quality moving picture with a camera having an excellent portability.

In an example, it is possible to provide a small-sized, high-image-quality portable information device where a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels is used as a photographing optical system of a camera function unit. Therefore, it is possible for a user to photograph a high quality moving picture or still image with a portable information device having a high portability.

As another embodiment, in order to correct the axial chromatic aberration at the long focal end, the first lens unit may be configured to include, in order from the object side, the negative lens L11, the positive lens L12, and the positive lens L13, and the positive lens L13 in the first lens unit may satisfy the following condition formulas (1), (2), and (3).

$$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

In addition, the first lens unit may have a diffraction plane, and the condition formula (4) may be satisfied.

$$50 < fdoe/f1 < 200 \quad (4)$$

Herein, in the above-described condition formulas (1) to (4), $n_d$ denotes a refractive index of the positive lens L13, $v_d$ denotes an Abbe number of the positive lens L13, $P_{g,F}$ denotes a partial dispersion ratio of the positive lens L13, fdoe is a focal length of the diffraction plane, and f1 denotes a focal length of the first lens unit.

Herein, when $n_g$, $n_F$, and $n_c$ denote refractive indexes of each positive lens L13 with respect to g-line, F-line, and c-line, $P_{g,F}$ is expressed by:

$$P_{g,F} = (n_g - n_F)/(n_F - n_c).$$

A focal length f of the diffraction plane is expressed by:

$$f = -1/(2 \times C2).$$

Herein, C2 denotes a coefficient of a second-order term of a phase function.

If the condition formulas (1), (2), and (3) are satisfied, it is possible to sufficiently correct the axial chromatic aberration at the long focal end.

If the value is smaller than the lower limit of the condition formula (1), the monochromatic aberration is not sufficiently corrected. If the value is smaller than the lower limit of the condition formula (2), the chromatic aberration is not sufficiently corrected. If the value is smaller than the lower limit of the condition formula (3), the second spectrum of the chromatic aberration is not sufficiently corrected. On the other hand, no optical material exceeding the upper limits of all the condition formulas (1), (2), and (3) exists, and even if such an optical material exists, the optical material is very special, expensive, and unreal.

On the other hand, as the condition formula (4) is satisfied, it is possible to sufficiently correct the axial chromatic aberration at the long focal end.

If the value is larger than the upper limit of the condition formula (4), the correction of the axial chromatic aberration at the long focal end according to the diffraction plane becomes too small, so that it may not be possible to sufficiently correct the chromatic aberration. If the value is smaller than the lower limit of the condition formula (4), the axial chromatic aberration at the long focal end according to the diffraction plane is excessively corrected, the diffraction pitch becomes too small and, thus, processing becomes difficult, or flare greatly occurs.

More preferably, the following condition formula (4') may be satisfied.

$$100 < fdoe/f1 < 150 \quad (4')$$

In order to achieve higher performance, the following condition formula (4'') may be satisfied.

$$50 < fdoe/ft < 150 \quad (4'')$$

As the condition formula (4') is satisfied, it is possible to sufficiently correct the axial chromatic aberration at the long focal end.

At least the positive lens L13 in the first lens unit may satisfy the condition formulas (1), (2), and (3).

The configuration where at least the positive lens L13 in the first lens unit satisfies the above-described condition, that is, the condition formulas (1), (2), and (3), is necessary to correct the axial chromatic aberration. However, an optical material satisfying the condition formulas (1), (2), and (3) has a large change in refractive index according to temperature and a large linear expansion coefficient, and if the number of optical materials used is increased, an influence of the temperature on the performance occurs. Therefore, in order to reconcile the axial chromatic aberration with the influence of temperature on the performance, the positive lens satisfying the condition formulas (1), (2), and (3) may be used for only the positive lens 13 of the first lens unit.

In order to achieve higher performance, the following condition formula (5A) may be satisfied.

$$0.5 < f1/ft < 0.9 \tag{5A}$$

Herein, f1 denotes a focal length of the first lens unit, and ft denotes a focal length of the entire system at the long focal end.

If the value is larger than the upper limit of the condition formula (5A), the focal length of the first lens unit becomes too large, and the interval for changing magnification becomes large, so that the thickness excluding the first lens unit becomes small. Therefore, it is difficult to correct the aberration in the units excluding the first lens unit. If the value is smaller than the lower limit of the condition formula (5A), the focal length of the first lens unit becomes too small, so that it is difficult to correct the aberration in the first lens unit.

In order to achieve higher performance, the following condition formulas (6A), (7A), and (8A) may be satisfied.

$$-2.5 < f11/f1 < -1.0 \tag{6A}$$

$$0.5 < f12/f1 < 1.5 \tag{7A}$$

$$1.0 < f13/f1 < 3.0 \tag{8A}$$

Herein, f1 denotes a focal length of the first lens unit, f11 denotes a focal length of the negative lens L11 of the first lens unit, f12 denotes a focal length of the positive lens L12 of the first lens unit, and f13 denotes a focal length of the positive lens L13 of the first lens unit.

As the focal length of each lens satisfies the condition formulas (6A), (7A), and (8A), it is possible to sufficiently correct the aberration in the first lens unit.

In order to achieve the small size and high performance, the following condition formula (9A) may be satisfied.

$$0.15 < D1/ft < 0.25 \tag{9A}$$

Herein, D1 denotes a thickness of the first lens unit, and ft denotes a focal length of the entire system at the long focal end.

If the value is larger than the upper limit of the condition formula (9A), the thickness of the first lens unit becomes too large, the interval for changing magnification becomes small, and the focal length of each lens unit becomes too small, so that it is difficult to correct the aberration of the entire zoom range. On the other hand, if the value is smaller than the lower limit of the condition formula (9A), the thickness of the first lens unit becomes too small, so that it is difficult to correct the aberration in the first lens unit.

The fourth lens unit may be configured so that the 4a-th lens unit is arranged at the object side from the position having the largest interval in the fourth lens unit and the 4b-th lens unit is arranged at the image side. Furthermore, the 4a-th lens unit may be configured to include, in order from the object side, a positive lens, a positive lens, a positive lens, a negative lens, and a positive lens, and the 4b-th lens unit may be configured to include, in order from the object side, a negative lens and a positive lens.

In the 4a-th lens unit, since an axial marginal ray of light passes through a high position, the lens configuration of the large-diameter lens becomes important. Therefore, as the above-described configuration is made, it is possible to sufficiently correct the spherical aberration or the comatic aberration overall.

In addition, as the 4b-th lens unit is configured as described above, it is possible to appropriately set an exit pupil distance while correcting the aberration remaining in the 4a-th lens unit.

The fourth lens unit may be configured so that the 4a-th lens unit is arranged at the object side from the position having the largest interval in the fourth lens unit, the 4b-th lens unit is arranged at the image side, and only the two positive lens among the positive lenses of the 4a-th lens unit satisfy the following condition 1, that is, the condition formulas (1), (2), and (3).

$$1.40 < n_d < 1.65 \tag{1}$$

$$65.0 < v_d < 100.0 \tag{2}$$

$$0.015 < P_{g,F} - (-0.001802 \times v_d + 0.6483) < 0.060 \tag{3}$$

Herein, $n_d$ denotes a refractive index of the positive lens of the fourth lens unit, $v_d$ denotes an Abbe number of the positive lens, and $P_{g,F}$ denotes a partial dispersion ratio of the positive lens.

Herein, $P_{g,F} = (n_g - n_F)/(n_F - n_c)$, and $n_g$, $n_F$, and $n_c$ denote refractive indexes of each positive lens with respect to g-line, F-line, and c-line.

It is preferable that the lens satisfying the condition formulas (1), (2), and (3) be used for the 4a-th lens unit in order to correct the axial chromatic aberration. However, an optical material satisfying the condition formulas (1), (2), and (3) has a large change in refractive index according to temperature and a large linear expansion coefficient, and if the number of optical materials used is increased, an influence of the temperature on the performance occurs. Therefore, in order to reconcile the axial chromatic aberration with the influence of temperature on the performance, the two positive lenses satisfying the condition formulas (1), (2), and (3) may be used for the 4a-th lens unit.

In order to achieve higher performance over the entire zoom range, it is preferable that the following condition formula (10) be satisfied.

$$0.10 < f4/ft < 0.25 \tag{10}$$

Herein, f4 is a focal length of the fourth lens unit, and ft is a focal length of the entire system at the long focal end.

As the condition formula (10) is satisfied, the fourth lens unit takes balance over the entire zoom range, so that it is possible to achieve correction of aberration over the entire zoom range.

In addition, when the light amount arriving on the image surface needs to be reduced, although the stop may be configured to be decreased, it is preferable that the light amount be reduced by inserting an ND filter or the like into the optical axis without greatly changing the diameter of the stop in terms that the deterioration in the resolving power according to the diffraction phenomenon may be prevented.

It is preferable that focusing be performed by using the first lens unit. In the case where focusing is performed by using the first lens unit, there is a merit in that the position of the first lens unit as a focusing unit is the same even in any zoom range. Particularly, in the case of photographing a moving picture, there is a merit in that focusing does not need to be performed again at the time of zooming.

It is preferable that a laminated-type diffraction optical element be used for the diffraction plane. As the optical elements having appropriate refractive index difference with respect to each wavelength are laminated, it is possible to increase diffraction efficiency over the wide wavelength range.

In addition, the laminated optical element may be configured to be in close contact with the lens surface. Furthermore, as the cemented surface of the lens is configured as a diffraction structure, it is possible to implement a robust configuration which may withstand an influence (disturbance) of the environment on the diffraction plane.

On the other hand, if the above-described zoom lens according to examples of the present invention is used as a photographing optical system or a moving picture photographing optical system, it is possible to configure a camera such as a so-called digital camera or a moving picture photographing camera.

The camera is configured to include the above-described zoom lens as a photographing optical system, so that it is possible to implement a small-sized, high-image-quality camera having a magnification changing range capable of sufficiently covering a typical photographing range.

In addition, a photographing optical system of a photographing function unit of a so-called portable information device having a photographing function unit such as a camera function may be configured by using the above-described zoom lens.

The portable information device has a photographing function and is configured to include the above-described zoom lens as a photographing optical system, so that it is possible to provide a small-sized, high-image-quality portable information device having a magnification changing range capable of sufficiently covering a typical photographing range. Therefore, it is possible for a user to photograph a high-quality image with a portable information device having an excellent portability and to transmit the image to the outside.

As described above, according to an example, it is possible to provide a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels.

In addition, in an example, it is possible to correct the chromatic aberration well while suppressing the influence of change in temperature on the performance, so that it is possible to provide a high-performance zoom lens. Therefore, it is possible to implement a camera capable of obtaining good representation even in the case where there is a change in temperature while suppressing color blur over the entire screen.

In addition, in an example, since it is possible to provide a high-performance zoom lens having better correction of aberrations, it is possible to implement a high-image-quality camera having a higher resolving power.

In addition, in an example, since it is possible to provide a small-sized, high-performance zoom lens, it is possible to implement a small-sized camera capable of obtaining good representation.

In addition, in an example, since it is possible to provide a small-sized, high-image-quality camera where a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels is used as a photographing optical system, it is possible for a user to photograph a high quality image with a camera having an excellent portability.

In an example, since it is possible to provide a small-sized camera or portable information device capable of photographing a moving picture with a high quality where a zoom lens having a magnification changing ratio of about X16, a half angle of view of about 30 degrees at a short focal end, an F number of 2.0 or less at the short focal end, an F number of about 2.0 at a long focal end, the number of lens constituents of about 15 to 16, a relatively low cost, sufficient correction of aberration in a near infrared wavelength range, a small size, and a resolving power corresponding to imaging elements of 1 mega to 5 mega pixels is used as a photographing optical system of a camera function unit, it is possible for a user to photograph a high quality moving picture or still image with a camera or portable information device having a high portability.

EXAMPLE 1

Next, specific examples based on the above-described principle embodiment of the present invention will be described in detail. Examples 1 to 4 described hereinafter are examples having specific configurations corresponding to numerical examples (Numerical Examples) of the zoom lenses according to the first to fourth embodiments of the present invention. FIGS. 1 to 4 are diagrams for explaining the zoom lens according to Example 1 of the first embodiment of the present invention. FIGS. 5 to 8 are diagrams for explaining the zoom lens according to Example 2 of the second embodiment of the present invention. FIGS. 9 to 12 are diagrams for explaining the zoom lens according to Example 3 of the third embodiment of the present invention. In addition, FIGS. 13 to 16 are diagrams for explaining the zoom lens according to Example 4 of the fourth embodiment of the present invention.

All the zoom lenses according to Examples 1 to 4 are so-called positive-negative-negative-positive four-lens-unit zoom lenses, where the first lens unit having a positive refractive power, the second lens unit having a negative refractive power, the third lens unit having a negative refractive power, and the fourth lens unit having a positive refractive power are arranged in order from the object side.

In the zoom lens of each example of Examples 1 to 4, an optical element configured with a parallel plate arranged at the image surface side of the fourth lens unit is assumed to be various optical filters such as an optical low pass filter and a UV cutoff filter, a cover glass (seal glass) for an image-receiving/imaging element such as a CMOS (complementary metal oxide semiconductor) image sensor or a CCD (charge coupled device) image sensor, or the like. Herein, the element is collectively referred to as a filter or the like FG as an equivalent transparent parallel plate.

In addition, a parallel plate arranged at the object side or the image side of a stop AD is assumed to be various filters F such as an ND filter.

In addition, glass materials for optical glass used in each example of Examples 1 to 4 are indicated by optical glass type names of products of OHARA INC. and HOYA CORPORATION.

In all the examples, although all the materials of lenses are described to be optical glass, a resin may be used.

In the zoom lens of each example of Examples 1 to 4, the aberrations are sufficiently corrected, so that the examples may be adapted to an image receiving element of 1 mega to 5 mega pixels or more. It will be obvious from each example of Examples 1 to 4 that, if the zoom lens is configured according to the first to fourth embodiments of the present invention, it is possible to achieve a sufficiently small size and to secure a very excellent imaging performance.

Meanings of symbols common to Examples 1 to 4 are as follows.

f: focal length of the entire system of an optical system
F: F value (F number)
ω: half angle of view (degrees)
R: radius of curvature
D: surface interval
$n_d$: refractive index
$v_d$: Abbe number
C2: coefficient of the second-order term of a phase function
C4: coefficient of the fourth-order term of the phase function When a reference wavelength (d-line) is denoted by λd, a distance from an optical axis is denoted by h, and a phase is denoted by ϕ(h), the shape of the diffraction grating is expressed by:

$$\phi(h) = (2\pi/\lambda d)(C2 \cdot h^2 + C4 \cdot h^4).$$

Figure 1B:
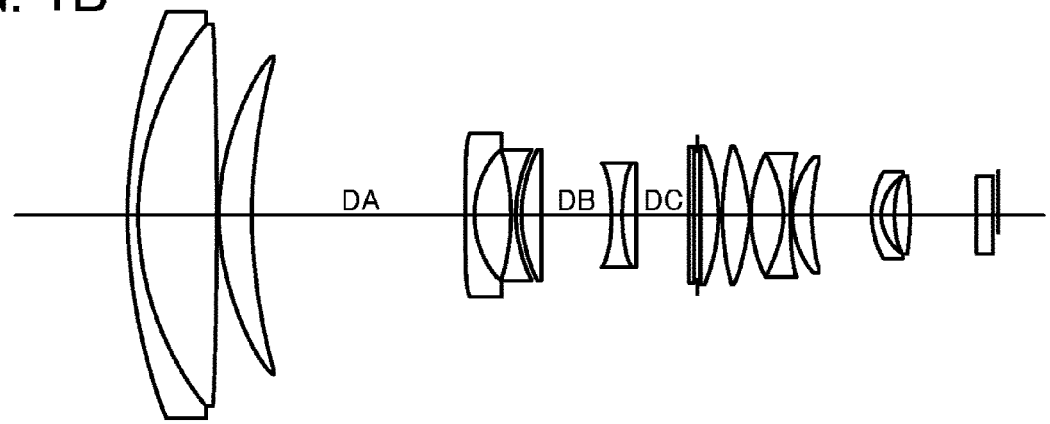
Figure 1C:
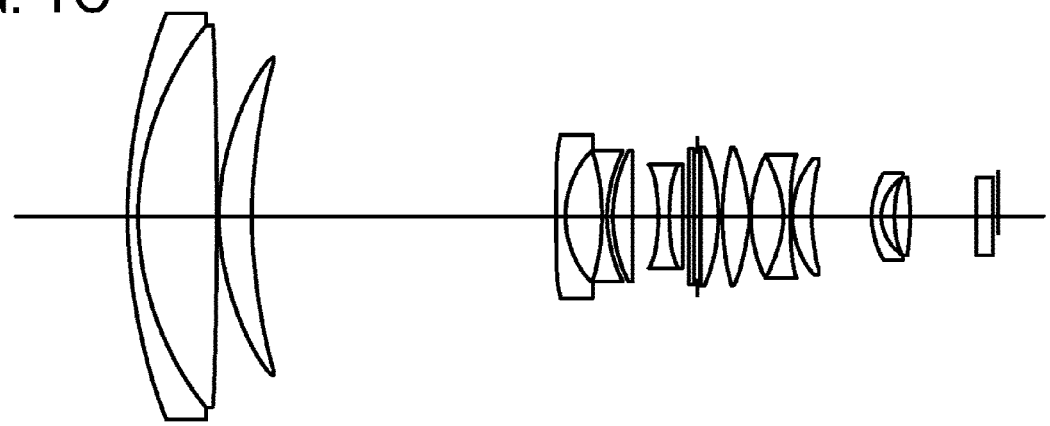

FIGS. 1A, 1B, and 1C illustrate a lens configuration of an optical system and a zoom locus involved with zooming from a short focal end, that is, a wide-angle end, through a predetermined intermediate focal length to a long focal end, that is, a telephoto end according to the zoom lens according to Example 1 of the first embodiment of the present invention, FIG. 1A is a cross-sectional diagram illustrating the short focal end, that is, the wide-angle end, FIG. 1B is a cross-sectional diagram illustrating the predetermined intermediate focal length, and FIG. 1C is a cross-sectional diagram illustrating the long focal end, that is, the telephoto end. In addition, in FIGS. 1A to 1C illustrating the arrangement of the lens unit of Example 1, the left side of the illustration is the object side (subject side).

The zoom lens illustrated in FIGS. 1A to 1C is configured to include, in order from the object side, a first lens unit G1 having a positive refractive power, a second lens unit G2 having a negative refractive power, a third lens unit G3 having a negative refractive power, and a fourth lens unit G4 having a positive refractive power.

The fourth lens unit G4 is configured to include a 4a-th lens unit G4a which is arranged at the object side from the position having the largest interval in the fourth lens unit G4 and a 4b-th lens unit G4b which is arranged at the image side.

The first to fourth lens units G1 to G4 are supported by an appropriate common support frame or the like for each unit; during the zooming or the like, each unit of the second lens unit G2 and the third lens unit G3 is integrally operated; and the stop AD is installed integrally with the fourth lens unit G4. In FIGS. 1A to 1C, each optical surface is indicated by a surface number. In addition, each reference numeral in FIGS. 1A to 1C is used independently of each example in order to avoid complication of the description due to an increase in digit number of reference numerals. Therefore, a component indicated by the same reference numeral in the figures associated with a different embodiment may not necessarily have the same configuration as that of the different embodiment.

During a change of magnification from the short focal end (wide-angle end) to the long focal end (telephoto end), the first lens unit G1 is stationary, the second lens unit G2 is moved to the image side, the third lens unit G3 is moved, and the fourth lens unit G4 is stationary. As a result, the lens units are moved so that the interval between the first lens unit G1 and the second lens unit G2 becomes large and the interval between the second lens unit G2 and the third lens unit G3 becomes small.

In the first embodiment of the present invention illustrated in FIGS. 1A to 1C, the first lens unit G1 of the zoom lens according to Example (numerical example: hereinafter, the same is applied) 1 is configured to include, in order from the object side, a negative lens L11 which is configured with a negative meniscus lens directing the concave surface toward the image surface side, a positive lens L12 which is configured with a biconvex lens directing the convex surface having a large curvature from the image surface side toward the object side, and a positive lens L13 which is configured with a positive meniscus lens directing the convex surface toward the object side.

A laminated-type diffraction optical element is configured to be in close contact with the lens surface of the first lens unit G1, in the case of this example, a cemented surface.

In addition, the two lenses of the negative lens L11 and the positive lens L12 of the first lens unit G1 are closely adhered to each other to be integrally cemented, so that a two-sheet cemented lens is formed.

The second lens unit G2 is configured to include, in order from the object side, a negative lens L21 which is configured with a negative meniscus lens directing the concave surface toward the image surface side, a negative lens L22 which is configured with a biconcave lens directing the concave surface having a large curvature from the surface of the object side toward the image surface side, and a positive lens L23 which is configured with a positive meniscus lens directing the convex surface toward the object side.

The third lens unit G3 is configured to include a negative lens L31 configured with a biconcave lens directing the concave surface having a large curvature from the image surface side toward at the object side and a positive lens L32 configured with a plano-convex lens directing the convex surface toward the object side.

In addition, the two lenses of the negative lens L31 and the positive lens L32 of the third lens unit G3 are closely adhered to each other to be integrally cemented, so that a two-sheet cemented lens is formed.

A stop AD and various filters F such as an ND filter which is adjacent to the stop AD and is configured with parallel plate are inserted between the third lens unit G3 and the fourth lens unit G4 to be retained integrally with the fourth lens unit G4.

In the fourth lens unit G4, the 4a-th lens unit G4a which is arranged at the object side from the position having the largest interval in the fourth lens unit G4 is configured to include, in order from the object side, a positive lens L4a1 which is configured with a positive meniscus lens directing the convex surface toward the image surface side, a positive lens L4a2 which is configured with a biconvex lens directing the convex surface having a large curvature from the surface of the object side toward the image surface side, a positive lens L4a3 which is configured with a biconvex lens directing the convex surface having a large curvature from the surface of the object side toward the image surface side, a negative lens L4a4 which is configured with a biconcave lens directing the concave surface having a large curvature from the surface of the image surface side toward the object side, and, a positive lens L4a5 which is configured with a positive meniscus lens directing the convex surface toward the object side.

In addition, the positive lens L4a3 and the negative lens L4a4 of the 4a-th lens unit G4a are closely adhered to each other to be integrally cemented, so that a two-sheet cemented lens is formed.

In the fourth lens unit G4, the 4b-th lens unit G4b which is arranged at the image surface side from the position having the largest interval in the fourth lens unit G4 is configured to include, in order from the object side, a negative lens L4b1 which is configured with a negative meniscus lens directing the concave surface toward the image surface side and a positive lens L4b2 which is configured with a biconvex lens directing the convex surface having a large curvature from the image surface side toward the object side.

In addition, various optical filters such as an optical low pass filter or an IR cutoff filter or a cover glass (seal glass) for an image-receiving/imaging element such as a CMOS image sensor or a CCD image sensor are assumed to be arranged at the image surface side of the 4a-th lens unit G4a. Herein, a filter or the like FG illustrated as an equivalent transparent parallel plate is arranged.

In this case, as illustrated in FIGS. 1A to 1C, during a change of magnification from the short focal end to the long focal end, the first lens unit G1 is stationary, the second lens unit G2 is moved to the image side, the third lens unit G3 is moved, and the fourth lens unit G4 is stationary. As a result, the interval between the first lens unit G1 and the second lens unit G2 becomes large and the interval between the second lens unit G2 and the third lens unit G3 becomes small.

It is preferable that focusing be performed by using the first lens unit G1.

This is because there is a merit in that, in the case where focusing is performed by using the first lens unit, the position of the first lens unit as a focusing unit is the same even in any zoom range.

In Example 1, the focal length f of the entire optical system, the F number F, and the half angle of view ω are changed in the respective ranges of f=7.72~30.00~116.43, F=1.64~1.64~1.92, and ω=32.64~8.59~2.24 by the zooming from the short focal end to the long focal end. Optical characteristics of each optical element are listed in the following Table 1

TABLE 1

| | R | D | n | ν | Glass |
|---|---|---|---|---|---|
| 1 | 105.172 | 1.80 | 1.84666 | 23.78 | S-TIH53(OHARA) |
| 2 | 58.916 | 12.82 | 1.71299 | 53.87 | S-LAL8(OHARA) |
| 3 | −823.438 | 0.50 | | | |
| 4 | 53.201 | 5.42 | 1.59522 | 67.73 | S-FPM2(OHARA) |
| 5 | 115.805 | DA | | | |
| 6 | 340.793 | 1.20 | 1.83481 | 42.72 | S-LAH55V(OHARA) |
| 7 | 17.250 | 6.05 | | | |
| 8 | −49.148 | 1.20 | 1.83481 | 42.72 | S-LAH55V(OHARA) |
| 9 | 26.075 | 0.65 | | | |
| 10 | 26.093 | 3.19 | 1.92286 | 18.90 | S-NPH2(OHARA) |
| 11 | 2224.067 | DB | | | |
| 12 | −25.386 | 1.20 | 1.85026 | 32.27 | S-LAH71(OHARA) |
| 13 | 27.274 | 2.43 | 1.92286 | 18.90 | S-NPH2(OHARA) |
| 14 | 0.000 | DC | | | |
| 15 | 0.000 | 0.80 | 1.51633 | 64.14 | S-BSL7(OHARA) |
| 16 | 0.000 | 0.50 | | | |
| 17 | Stop | 0.52 | | | |
| 18 | −3594.141 | 2.98 | 1.73400 | 51.47 | S-LAL59(OHARA) |
| 19 | −33.803 | 0.50 | | | |
| 20 | 45.338 | 4.34 | 1.43875 | 94.94 | S-FPL53(OHARA) |
| 21 | −33.365 | 0.50 | | | |
| 22 | 27.968 | 5.10 | 1.49700 | 81.54 | S-FPL51(OHARA) |
| 23 | −24.012 | 1.20 | 1.90366 | 31.31 | TAFD25(HOYA) |
| 24 | 57.356 | 0.50 | | | |
| 25 | 17.112 | 3.15 | 1.69680 | 55.53 | S-LAL14(OHARA) |

TABLE 1-continued

| | R | D | n | ν | Glass |
|---|---|---|---|---|---|
| 26 | 51.078 | 9.97 | | | |
| 27 | 17.233 | 1.20 | 1.48749 | 70.24 | S-FSL5(OHARA) |
| 28 | 8.267 | 2.37 | | | |
| 29 | 22.202 | 2.45 | 1.49700 | 81.54 | S-FPL51(OHARA) |
| 30 | −51.046 | 11.10 | | | |
| 31 | 0.000 | 2.70 | 1.49782 | 67.00 | Filter or the like |
| 32 | 0.000 | | | | |

In Example 1, variable amounts such as the focal length f of the entire optical system, the F value, the half angle of view ω, the variable interval DA between the first lens unit G1 and the second lens unit G2, the variable interval DB between the second lens unit G2 and the third lens unit G3, the variable interval DC between the third lens unit G3 and the filter F, and the like are changed according to zooming as listed in the following Table 2.

TABLE 2

| | Wide | Mean | Tele |
|---|---|---|---|
| f | 7.72 | 30.00 | 116.43 |
| F Number | 1.64 | 1.64 | 1.92 |
| ω | 32.64 | 8.59 | 2.24 |
| DA | 1.4995 | 34.8101 | 49.9571 |
| DB | 48.2698 | 12.0597 | 4.7098 |
| DC | 5.9002 | 8.7983 | 0.9998 |

When the coefficients of the second-order and fourth-order terms of the phase function are denoted by C2 and C4, respectively, the focal length fdoe of the diffraction plane is expressed by:

$$fdoe = -1/(2 \times C2).$$

In Example 1, the coefficient C2 of the second-order term of the phase function of the diffraction plane formed on the second surface, that is, the cemented surface between the negative lens L11 and the positive lens L12 is as listed in the following Table 3. In addition, the coefficient C4 of the fourth-order term of the phase function is also listed.

TABLE 3

| Coefficient of Phase Function | | |
|---|---|---|
| λ | C2 | C4 |
| 2   587.6 | −5.77839E−05 | 5.92300W−09 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 1, the values corresponding to the aforementioned condition formulas (1) to (9) are as listed in the following Table 4 and satisfy the respective condition formulas (1) to (9). Particularly, in the 4a-th lens unit G4a, both the positive lens L4a2 and the positive lens L4a3 satisfy the condition formulas (1), (2), (3), and (6).

TABLE 4

| | Condition Formula | | |
|---|---|---|---|
| L4a2 | $n_d$ | (1) | 1.43875 |
| | $v_d$ | (2) | 94.94 |
| | $P_{gF} - (-0.001802 \times v_d + 0.6483)$ | (3) | 0.057 |
| L4a3 | $n_d$ | (1) | 1.49700 |
| | $v_d$ | (2) | 81.54 |
| | $P_{gF} - (-0.001802 \times v_d + 0.6483)$ | (3) | 0.036 |
| f1doe/f1 | | (4) | 110.32 |
| f1doe/ft | | (4') | 74.32 |
| Da/D4 | | (5) | 0.28 |
| L4a2 | f4p/f4 | (6) | 2.28 |
| L4a3 | f4p/f4 | (6) | 1.37 |
| (R1 − R2)/(R1 + R2) | | (7) | 0.35 |
| D4b/D4a | | (8) | 0.30 |
| f4/ft | | (9) | 0.17 |

In addition, in the case of a modified example of Example 1, the values corresponding to the aforementioned condition formulas (1) to (10) are as listed in the following Table 4A and satisfy the respective condition formulas (1) to (10).

TABLE 4A

| | Condition Formula | | |
|---|---|---|---|
| L3 | $n_d$ | (1) | 1.59522 |
| | $v_d$ | (2) | 67.73 |
| | $P_{gF} - (-0.001802 \times v_d + 0.6483)$ | (3) | 0.018 |
| fdoe/f1 | | (4) | 110.32 |
| f1doe/ft | | (4') | 74.32 |
| f1/ft | | (5A) | 0.67 |
| f11/f1 | | (6A) | −2.05 |
| f12/f1 | | (7A) | 0.99 |
| f13/f1 | | (8A) | 2.04 |
| D1/ft | | (9A) | 0.18 |
| f4/ft | | (10) | 0.17 |

Figure 2:
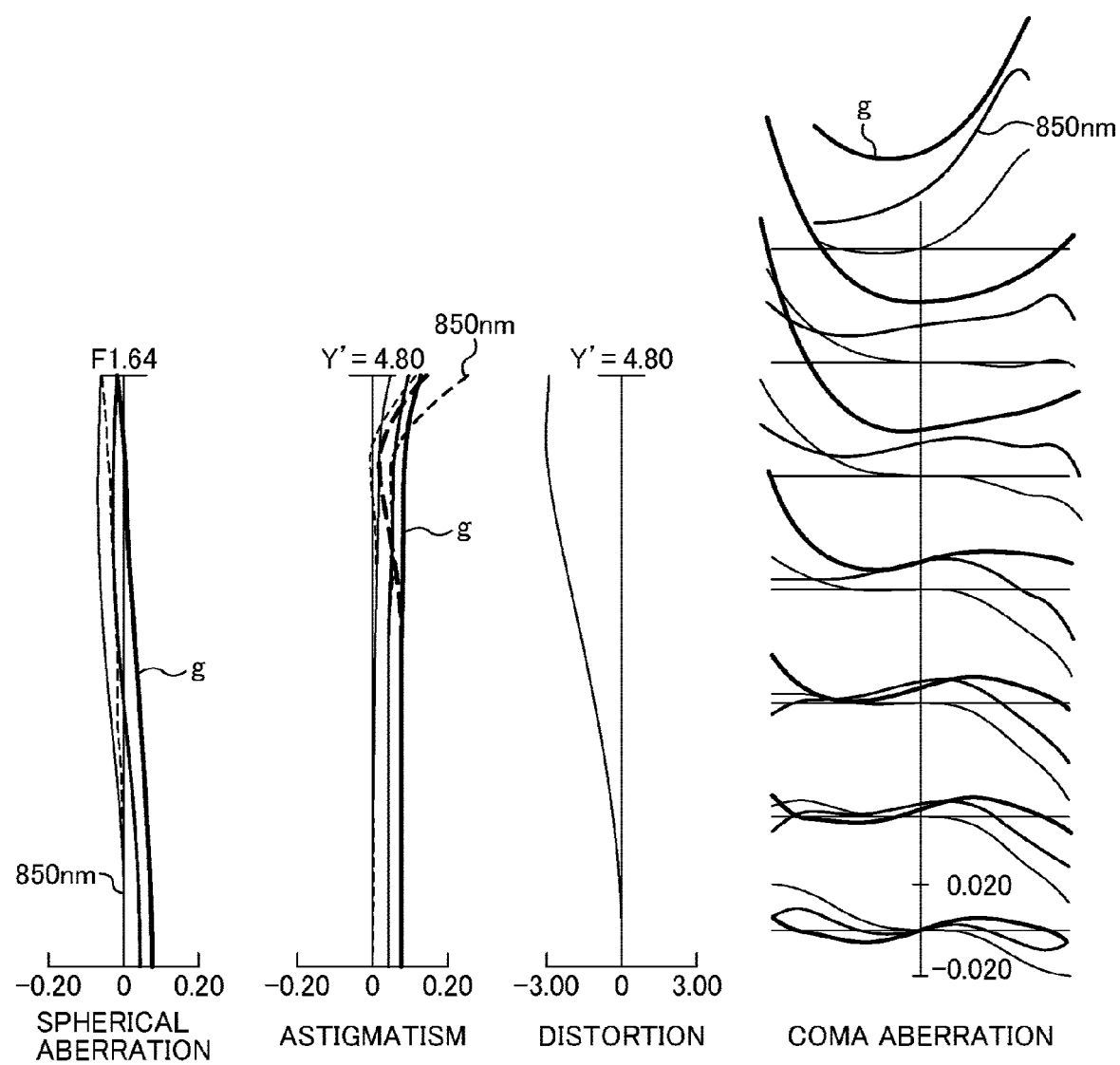
FIG. 2 is an aberration graph illustrating spherical aberration, astigmatism, distortion aberration, and comatic aberration at the short focal end (wide-angle end) of the zoom lens according to Example 1 of the present invention illustrated in FIGS. 1A to 1C.
Figure 3:
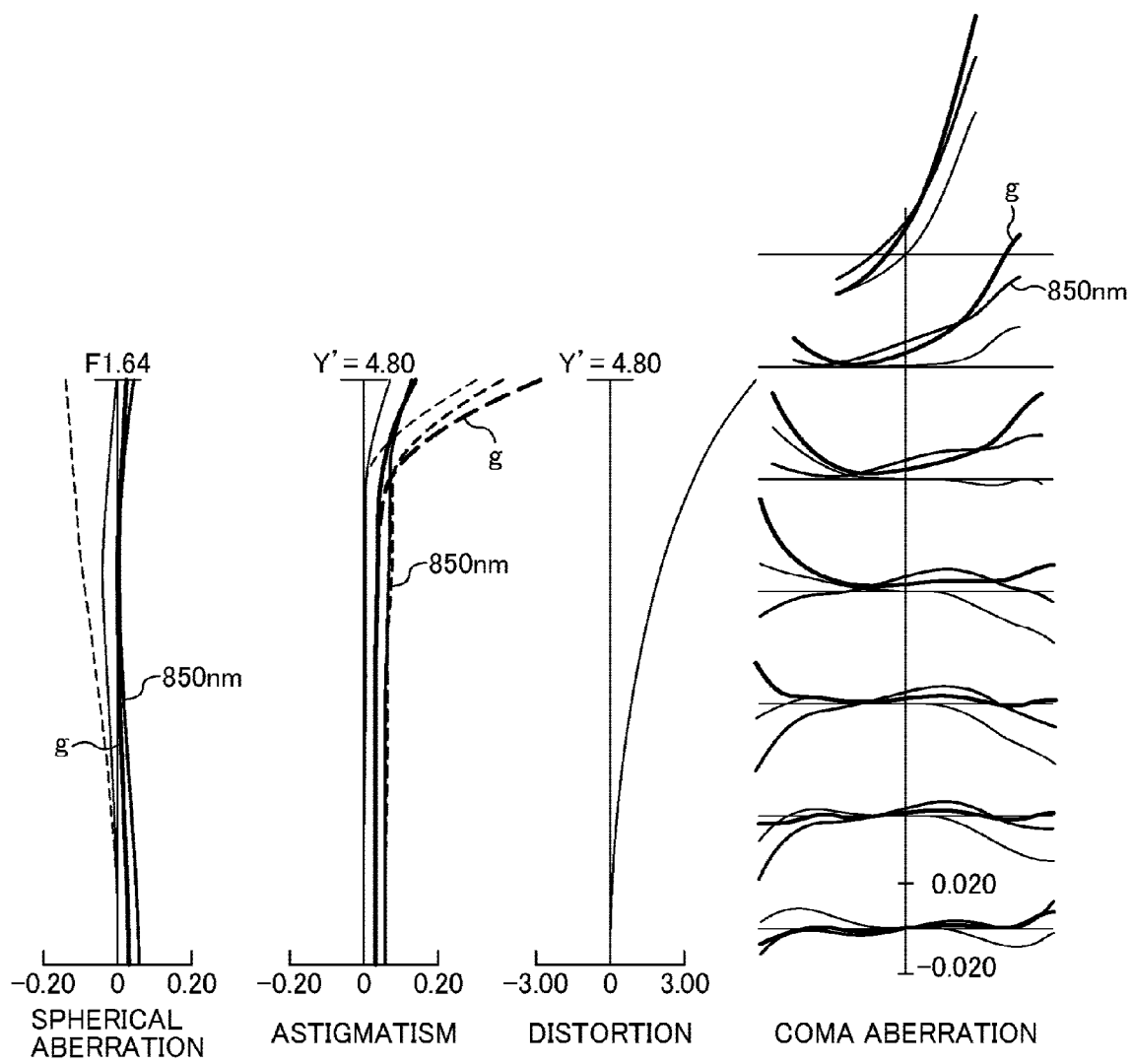
FIG. 3 is an aberration graph illustrating spherical aberration, astigmatism, distortion aberration, and comatic aberration at the intermediate focal length of the zoom lens according to Example 1 of the present invention illustrated in FIGS. 1A to 1C.

In addition, FIG. 2, FIG. 3, and FIG. 4 illustrate aberration graphs of spherical aberration, astigmatism, distortion aberration, and comatic aberration at the short focal end (wide-angle end), the intermediate focal length, and the long focal end (telephoto end) of Example 1, respectively. In addition, in the aberration graphs, a broken line of the spherical aberration graph indicates a sinusoidal condition; and a solid line and a broken line of the astigmatism graph indicate sagittal and meridional, respectively. The same is also applied in aberration graphs of other examples.

As obvious from FIGS. 2 to 4, in the zoom lens according to Example 1, the aberrations are sufficiently corrected. Since the example may be adapted to an image receiving element of 1 mega to 5 mega pixels, it is obvious that, as the zoom lens is configured according to Example 1, it is possible to achieve a sufficiently small size and to secure a very excellent imaging performance.

EXAMPLE 2

Figure 5A:
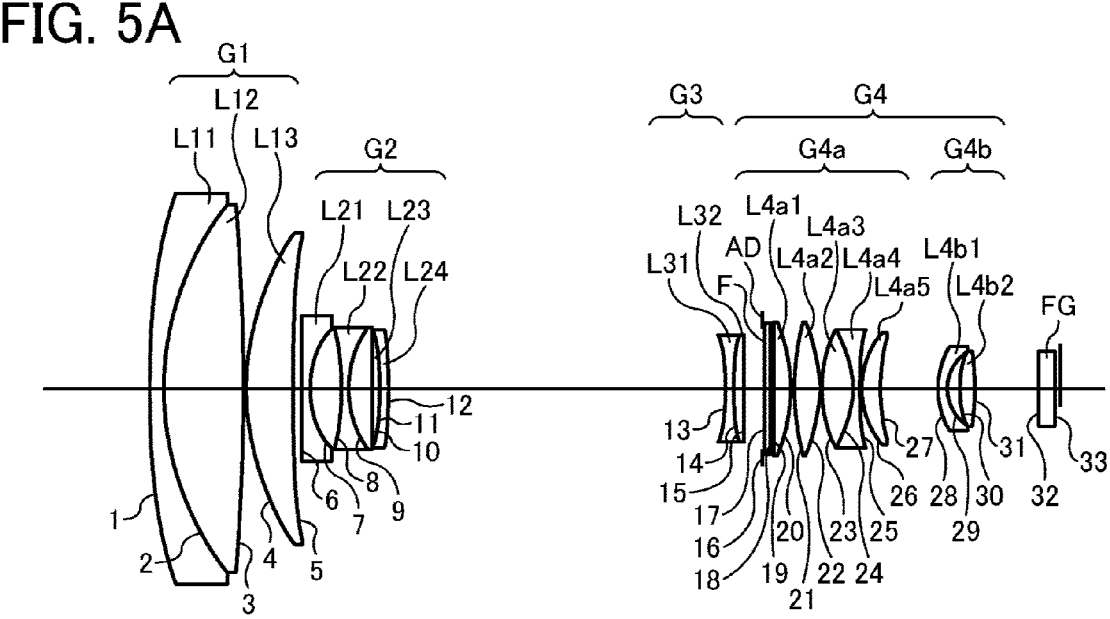
FIGS. 5A, 5B, and 5C are schematic diagrams illustrating a configuration of an optical system and a zoom locus involved with zooming of a zoom lens according to Example 2 of a second embodiment of the present invention.
Figure 5B:
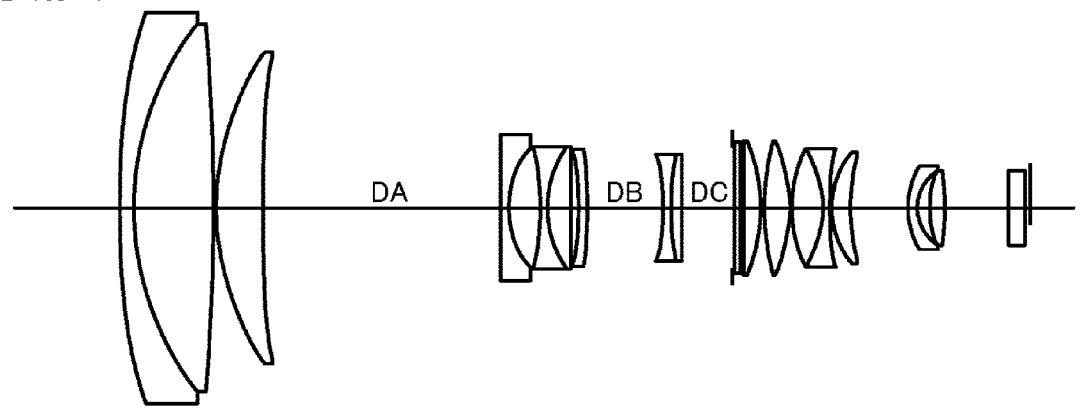
Figure 5C:
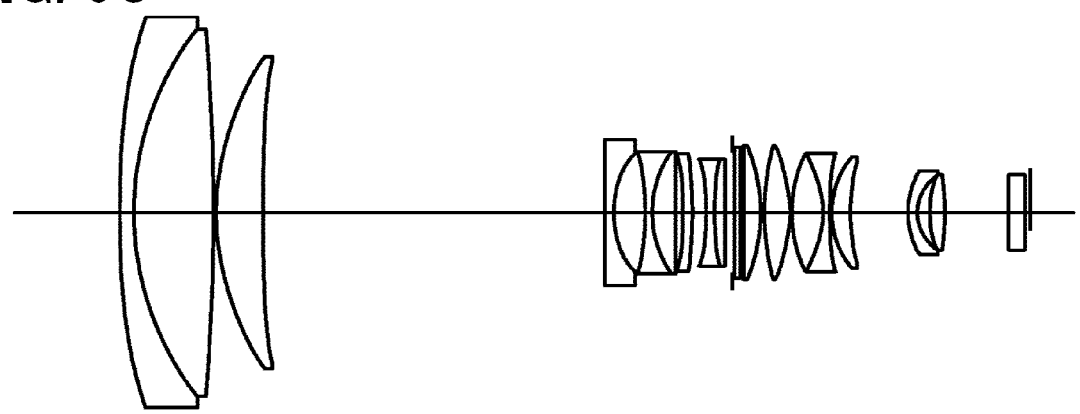

FIGS. 5A, 5B, and 5C illustrate a lens configuration of an optical system and a zoom locus involved with zooming from a short focal end, that is, a wide-angle end, through a predetermined intermediate focal length to a long focal end, that is, a telephoto end according to the zoom lens according to Example 2 of the second embodiment of the present invention. FIG. 5A is a cross-sectional diagram illustrating the short focal end, that is, the wide-angle end. FIG. 5B is a cross-sectional diagram illustrating the predetermined intermediate focal length. FIG. 5C is a cross-sectional diagram illustrating the long focal end, that is, the telephoto end. In addition, in FIGS. 5A to 5C illustrating the arrangement of the lens unit of Example 2, the left side of the illustration is the object side (subject side).

The zoom lens illustrated in FIGS. 5A to 5C is configured to include, in order from the object side, a first lens unit G1 having a positive refractive power, a second lens unit G2 having a negative refractive power, a third lens unit G3 having a negative refractive power, and a fourth lens unit G4 having a positive refractive power.

The fourth lens unit G4 is configured to include a 4a-th lens unit G4a which is arranged at the object side from the position having the largest interval in the fourth lens unit G4 and a 4b-th lens unit G4b which is arranged at the image side.

The first to fourth lens units G1 to G4 are supported by an appropriate common support frame or the like for each unit; during the zooming or the like, each unit of the second lens unit G2 and the third lens unit G3 is integrally operated; and the stop AD is installed integrally with the fourth lens unit G4. In FIGS. 5A to 5C, each optical surface is indicated by a surface number. In addition, each reference numeral in FIGS. 5A to 5C is used independently of each example in order to avoid complication of the description due to an increase in digit number of reference numerals. Therefore, a component indicated by the same reference numeral in the figures associated with a different embodiment may not necessarily have the same configuration as that of the different embodiment.

During a change of magnification from the short focal end (wide-angle end) to the long focal end (telephoto end), the first lens unit G1 is stationary, the second lens unit G2 is moved to the image side, the third lens unit G3 is moved, and the fourth lens unit G4 is stationary. As a result, the lens units are moved so that the interval between the first lens unit G1 and the second lens unit G2 becomes large and the interval between the second lens unit G2 and the third lens unit G3 becomes small.

In the second embodiment of the present invention illustrated in FIGS. 5A to 5C, the first lens unit G1 of the zoom lens according to Example (numerical example: hereinafter, the same is applied) 2 is configured to include, in order from the object side, a negative lens L11 which is configured with a negative meniscus lens directing the concave surface toward the image surface side, a positive lens L12 which is configured with a biconvex lens directing the convex surface having a large curvature from the image surface side toward the object side, and a positive lens L13 which is configured with a positive meniscus lens directing the convex surface toward the object side.

A laminated-type diffraction optical element is configured to be in close contact with the lens surface of the first lens unit G1, in the case of this example, a cemented surface.

In addition, the two lenses of the negative lens L11 and the positive lens L12 of the first lens unit G1 are closely adhered to each other to be integrally cemented, so that a two-sheet cemented lens is formed.

The second lens unit G2 is configured to include, in order from the object side, a negative lens L21 which is configured with a biconcave lens directing the concave surface having a large curvature from the object side toward the image surface side, a negative lens L22 which is configured with a biconcave lens directing the concave surface having a large curvature from the surface of the object side toward the image surface side, a positive lens L23 which is configured with a positive meniscus lens directing the convex surface toward the image surface side, and a negative lens L24 which is configured with a negative meniscus lens directing the concave surface toward the object side. In addition, the two lenses of the positive lens L23 and the negative lens L24 of the second lens unit G2 are closely adhered to each other to be integrally cemented, so that a two-sheet cemented lens is formed.

The third lens unit G3 is configured to include a negative lens L31 which is configured with a biconcave lens directing the concave surface having a large curvature from the surface of the image surface side toward the object side and a positive lens L32 which is configured with a plano-convex lens directing the convex surface toward the object side.

In addition, the two lenses of the negative lens L31 and the positive lens L32 of the third lens unit G3 are closely adhered to each other to be integrally cemented, so that a two-sheet cemented lens is formed.

A stop AD and various filters F such as an ND filter which is adjacent to the stop AD and is configured with parallel plate are inserted between the third lens unit G3 and the fourth lens unit G4 to be retained integrally with the fourth lens unit G4.

In the fourth lens unit G4, the 4a-th lens unit G4a which is arranged at the object side from the position having the largest interval in the fourth lens unit G4 is configured to include, in order from the object side, a positive lens L4a1 which is configured with a biconvex lens directing the convex surface having a large curvature from the surface of the object side toward the image surface side, a positive lens L4a2 which is configured with a biconvex lens directing the convex surface having a large curvature from the surface of the object side toward the image surface side, a positive lens L4a3 which is configured with a biconvex lens directing the convex surface having a large curvature from the surface of the object side toward the image surface side, a negative lens L4a4 which is configured with a biconcave lens directing the concave surface having a large curvature from the surface of the image surface side toward the object side, and a positive lens L4a5 which is configured with a positive meniscus lens directing the convex surface toward the object side.

In addition, the positive lens L4a3 and the negative lens L4a4 of the 4a-th lens unit G4a are closely adhered to each other to be integrally cemented, so that a two-sheet cemented lens is formed.

In the fourth lens unit G4, the 4b-th lens unit G4b which is arranged at the image surface side from the position having the largest interval in the fourth lens unit G4 is configured to include, in order from the object side, a negative lens L4b1 which is configured with a negative meniscus lens directing the concave surface toward the image surface side and a positive lens L4b2 which is configured with a biconvex lens directing the convex surface having a large curvature from the surface of the object side toward the image surface side.

In addition, various optical filters such as an optical low pass filter or an TR cutoff filter or a cover glass (seal glass) for an image-receiving/imaging element such as a CMOS image sensor or a CCD image sensor are assumed to be arranged at the image surface side of the 4a-th lens unit G4a. Herein, a filter or the like FG illustrated as an equivalent transparent parallel plate is arranged.

In this case, as illustrated in FIGS. 5A to 5C, during a change of magnification from the short focal end to the long focal end, the first lens unit G1 is stationary, the second lens unit G2 is moved to the image side, the third lens unit G3 is moved, and the fourth lens unit G4 is stationary. As a result, the interval between the first lens unit G1 and the second lens unit G2 becomes large, and the interval between the second lens unit G2 and the third lens unit G3 becomes small.

It is preferable that focusing be performed by using the first lens unit G1.

In Example 2, the focal length f of the entire optical system, the F number F, and the half angle of view ω are changed in the respective ranges of f=7.72~30.00~116.36, F=1.65~1.65~1.95, and ω=31.51~8.08~2.10 by the zooming from the short focal end to the long focal end. Optical characteristics of each optical element are as listed in the following Table 5.

TABLE 5

|  | R | D | n | ν | Glass |
|---|---|---|---|---|---|
| 1 | 154.835 | 2.50 | 1.80100 | 34.97 | S-LAM66(OHARA) |
| 2 | 57.891 | 1346 | 1.64000 | 60.08 | S-BSM81(OHARA) |
| 3 | −399.021 | 0.50 |  |  |  |
| 4 | 55.392 | 7.82 | 1.49700 | 81.54 | S-FPL51(OHARA) |
| 5 | 315.032 | DA |  |  |  |
| 6 | −741.299 | 1.20 | 1.90366 | 31.31 | TAFD25(HOYA) |
| 7 | 18.917 | 5.34 |  |  |  |
| 8 | −54.830 | 1.20 | 1.67790 | 50.72 | S-LAL56(OHARA) |
| 9 | 19.587 | 3.96 | 1.92286 | 20.88 | EFDS1(HOYA) |
| 10 | −1117.507 | 1.59 |  |  |  |
| 11 | −45.679 | 1.20 | 1.83481 | 42.72 | S-LAH55V(OHARA) |
| 12 | −95.761 | DB |  |  |  |
| 13 | −30.606 | 1.20 | 1.78590 | 44.20 | S-LAH51(OHARA) |
| 14 | 52.040 | 1.98 | 1.92286 | 18.90 | S-NPH2(OHARA) |
| 15 | 0.000 | DC |  |  |  |
| 16 | Stop | 0.50 |  |  |  |
| 17 | 0.000 | 0.80 | 1.51633 | 64.14 | S-BSL7(OHARA) |
| 18 | 0.000 | 0.50 |  |  |  |
| 19 | 2299.826 | 3.38 | 1.63930 | 44.87 | S-BAM12(OHARA) |
| 20 | −31.279 | 0.50 |  |  |  |
| 21 | 69.643 | 3.95 | 1.49700 | 81.54 | S-FPL51(OHARA) |
| 22 | −36.224 | 0.50 |  |  |  |
| 23 | 28.256 | 5.17 | 1.49700 | 81.54 | S-FPL51(OHARA) |
| 24 | −24.232 | 1.20 | 1.84666 | 23.78 | S-TIH53(OHARA) |
| 25 | 64.724 | 0.50 |  |  |  |
| 26 | 16.000 | 2.99 | 1.64769 | 33.79 | S-TIM22(OHARA) |
| 27 | 34.214 | 10.67 |  |  |  |
| 28 | 15.872 | 1.20 | 1.83481 | 42.72 | S-LAH55V(OHARA) |
| 29 | 9.146 | 2.30 |  |  |  |
| 30 | 32.708 | 2.44 | 1.60562 | 43.71 | S-BAM4(OHARA) |
| 31 | −30.703 | 11.10 |  |  |  |
| 32 | 0.000 | 2.70 | 1.49782 | 67.00 | Filter or the like |
| 33 | 0.000 |  |  |  |  |

In Example 2, variable amounts such as the focal length f of the entire optical system, the F value, the half angle of view ω, the variable interval DA between the first lens unit G1 and the second lens unit G2, the variable interval DB between the second lens unit G2 and the third lens unit G3, the variable interval DC between the third lens unit G3 and the stop AD, and the like are changed according to zooming as listed in the following Table 6.

TABLE 6

|  | Wide | Mean | Tele |
|---|---|---|---|
| f | 7.72 | 30.00 | 116.36 |
| F Number | 1.65 | 1.65 | 1.95 |
| ω | 31.51 | 8.08 | 2.10 |
| DA | 1.4977 | 40.1586 | 57.9489 |
| DB | 57.3204 | 13.1350 | 2.6996 |
| DC | 2.8085 | 8.3547 | 1.0000 |

When the coefficients of the second-order and fourth-order terms of the phase function are denoted by C2 and C4, respectively, the focal length fdoe of the diffraction plane is expressed by:

$$fdoe = -1(2 \times C2).$$

In Example 2, the coefficient C2 of the second-order term of the phase function of the diffraction plane formed on the second surface, that is, the cemented surface between the negative lens L11 and the positive lens L12 is as listed in the following Table 7. In addition, the coefficient C4 of the fourth-order term of the phase function is also listed.

TABLE 7

| Coefficient of Phase Function | | | |
|---|---|---|---|
| | λ | C2 | C4 |
| 2 | 587.6 | −4.67627E−05 | 8.70221E−09 |

In addition, as described above, when a reference wavelength (d-line) is denoted by λd, a distance from an optical axis is denoted by h, and a phase is denoted by φ(h), the shape of the diffraction grating is expressed by:

$$\phi(h)=2\pi/\lambda d(C2 \cdot h^2 + C4 \cdot h^4).$$

In the case of Example 2, the values corresponding to the aforementioned condition formulas (1) to (9) are as listed in the following Table 8 and satisfy the respective condition formulas (1) to (9). Particularly, in the 4a-th lens unit G4a, both the positive lens L4a2 and the positive lens L4a3 satisfy the condition formulas (1), (2), (3), and (6).

TABLE 8

| | Condition Formula | | |
|---|---|---|---|
| 4a2 | $n_d$ | (1) | 1.49700 |
| | $v_d$ | (2) | 81.54 |
| | $P_{gF} - (-0.001802 \times v_d + 0.6483)$ | (3) | 0.036 |
| L4a3 | $n_d$ | (1) | 1.49700 |
| | $v_d$ | (2) | 81.54 |
| | $P_{gF} - (-0.001802 \times v_d + 0.6483)$ | (3) | 0.036 |
| f1doe/f1 | | (4) | 121.30 |
| f1doe/ft | | (4') | 91.89 |
| Da/D4 | | (5) | 0.31 |
| L4a2 | f4p/f4 | (6) | 2.36 |
| L4a3 | f4p/f4 | (6) | 1.32 |
| (R1 − R2)/(R1 + R2) | | (7) | 0.27 |
| D4b/D4a | | (8) | 0.30 |
| f4/ft | | (9) | 0.18 |

In addition, in the case of a modified example of Example 2, the values corresponding to the aforementioned condition formulas (1) to (10) are as listed in the following Table 8A and satisfy the respective condition formulas (1) to (10).

TABLE 8A

| | Condition Formula | | |
|---|---|---|---|
| L3 | $n_d$ | (1) | 1.49700 |
| | $v_d$ | (2) | 81.54 |
| | $P_{gF} - (-0.001802 \times v_d + 0.6483)$ | (3) | 0.036 |
| fdoe/f1 | | (4) | 121.30 |
| f1doe/ft | | (4') | 91.89 |
| f1/ft | | (5A) | 0.76 |
| f11/f1 | | (6A) | −1.32 |
| f12/f1 | | (7'A) | 0.91 |
| f13/f1 | | (8A) | 1.52 |
| D1/ft | | (9A) | 0.21 |
| f4/ft | | (10) | 0.18 |

Figure 6:
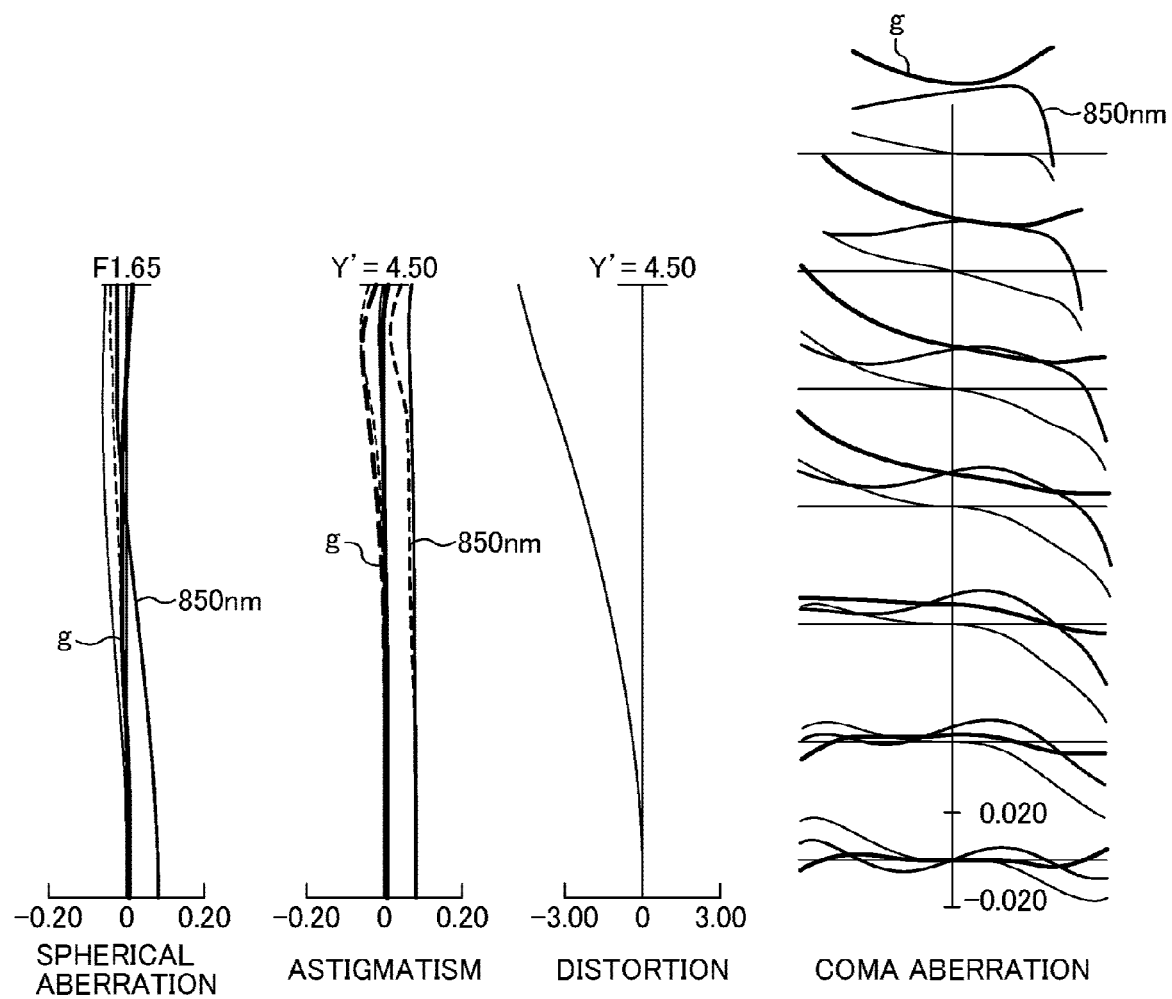
FIG. 6 is an aberration graph illustrating spherical aberration, astigmatism, distortion aberration, and comatic aberration at the short focal end of the zoom lens according to Example 2 of the present invention illustrated in FIGS. 5A to 5C.
Figure 7:
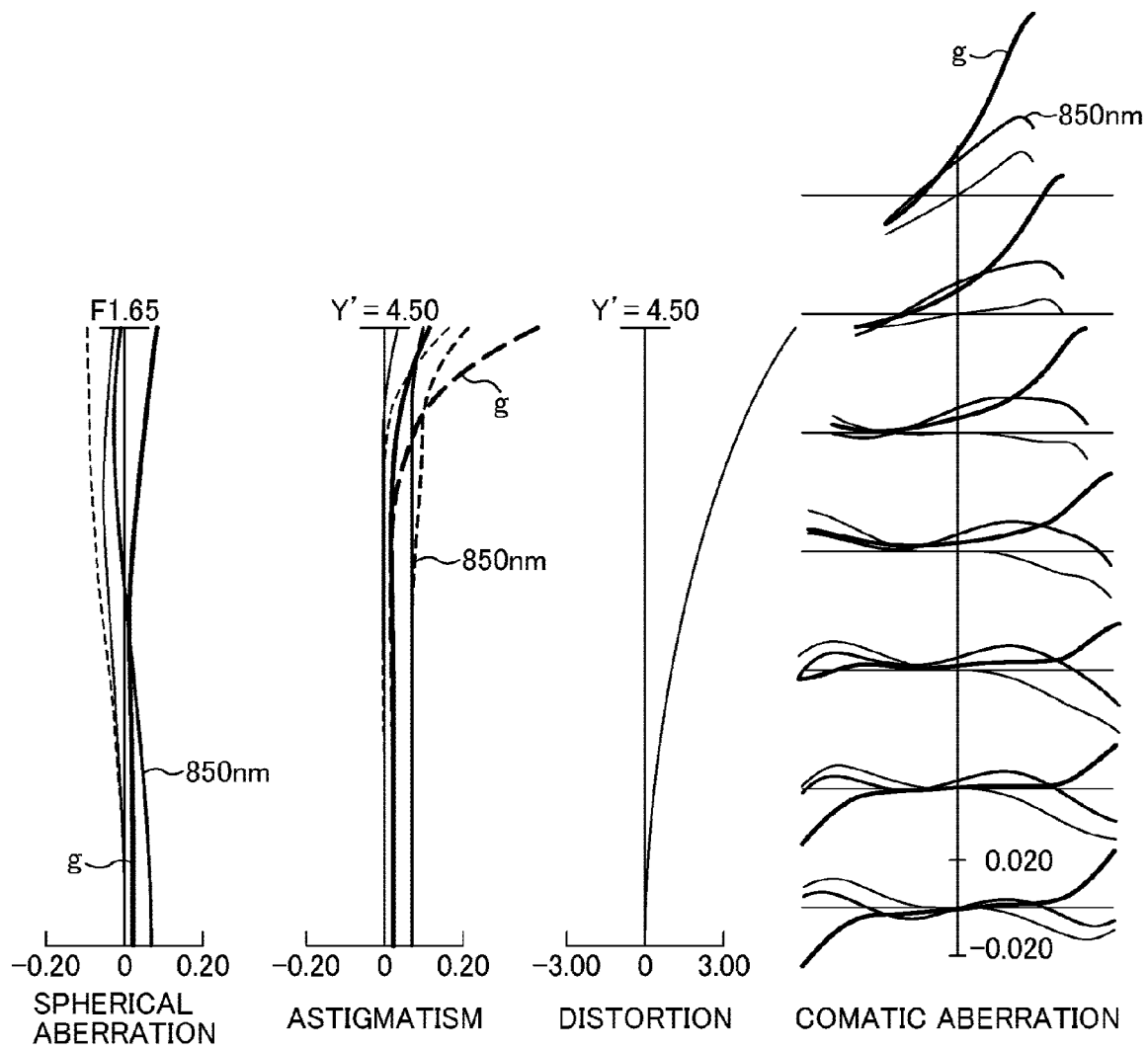
FIG. 7 is an aberration graph illustrating spherical aberration, astigmatism, distortion aberration, and comatic aberration at the intermediate focal length of the zoom lens according to Example 2 of the present invention illustrated in FIGS. 5A to 5C.
Figure 8:
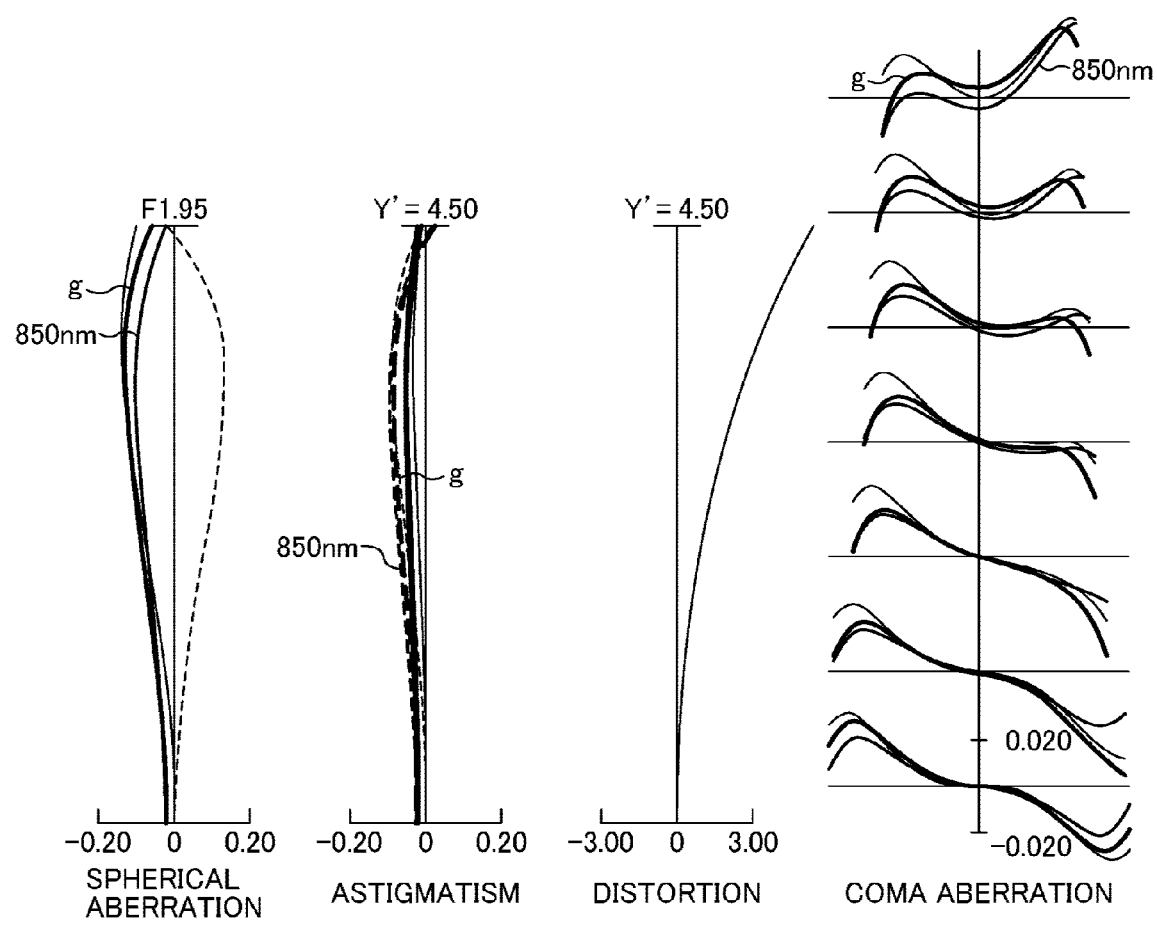
FIG. 8 is an aberration graph illustrating spherical aberration, astigmatism, distortion aberration, and comatic aberration at the long focal end of the zoom lens according to Example 2 of the present invention illustrated in FIGS. 5A to 5C.

In addition, FIG. 6, FIG. 7, and FIG. 8 illustrate aberration graphs of spherical aberration, astigmatism, distortion aberration, and comatic aberration at the short focal end (wide-angle end), the intermediate focal length, and the long focal end (telephoto end) of Example 2, respectively. In addition, in the aberration graphs, a broken line of the spherical aberration graph indicates a sinusoidal condition; and a solid line and a broken line of the astigmatism graph indicate sagittal and meridional, respectively. The same is also applied in aberration graphs of other examples.

As obvious from FIGS. 6 to 8, in the zoom lens according to Example 2, the aberrations are sufficiently corrected. Since the example may be adapted to an image receiving element of 1 mega to 5 mega pixels, it is obvious that, as the zoom lens is configured according to Example 2, it is possible to achieve a sufficiently small size and to secure a very excellent imaging performance.

EXAMPLE 3

Figure 9A:
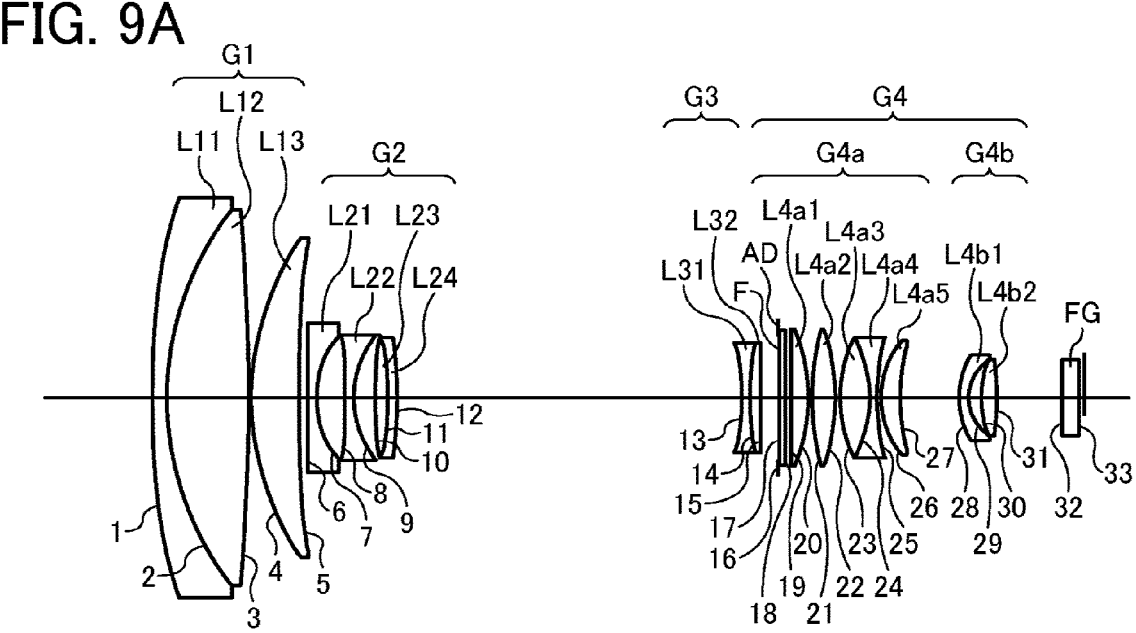
FIGS. 9A, 9B, and 9C are schematic diagrams illustrating a configuration of an optical system and a zoom locus involved with zooming of a zoom lens according to Example 3 of a third embodiment of the present invention.
Figure 9B:
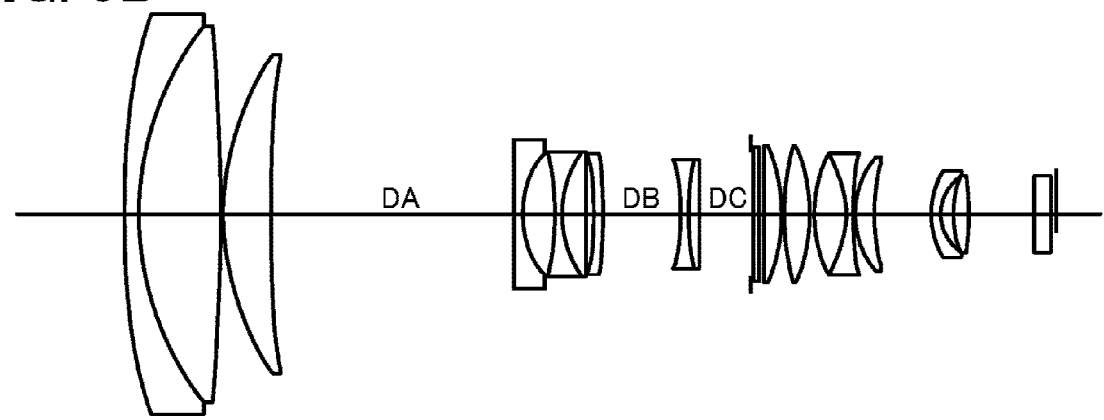
Figure 9C:
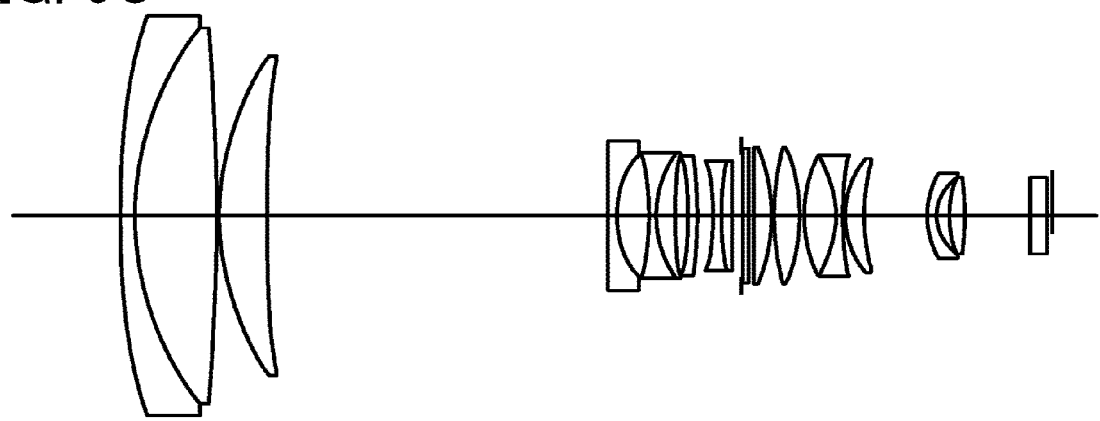

FIGS. 9A, 9B, and 9C illustrate a lens configuration of an optical system and a zoom locus involved with zooming from a short focal end, that is, a wide-angle end, through a predetermined intermediate focal length to a long focal end, that is, a telephoto end according to the zoom lens according to Example 3 of the third embodiment of the present invention, FIG. 9A is a cross-sectional diagram illustrating the short focal end, that is, the wide-angle end, FIG. 9B is a cross-sectional diagram illustrating the predetermined intermediate focal length, and FIG. 9C is a cross-sectional diagram illustrating the long focal end, that is, the telephoto end. In addition, in FIGS. 9A to 9C illustrating the arrangement of the lens unit of Example 3, the left side of the illustration is the object side (subject side).

The zoom lens illustrated in FIGS. 9A to 9C is configured to include, in order from the object side, a first lens unit G1 having a positive refractive power, a second lens unit G2 having a negative refractive power, a third lens unit G3 having a negative refractive power, and a fourth lens unit G4 having a positive refractive power.

The fourth lens unit G4 is configured to include a 4a-th lens unit G4a which is arranged at the object side from the position having the largest interval in the fourth lens unit G4 and a 4b-th lens unit G4b which is arranged at the image side.

The first to fourth lens units G1 to G4 are supported by an appropriate common support frame or the like for each unit; during the zooming or the like, each unit of the second lens unit G2 and the third lens unit G3 is integrally operated; and the stop AD is installed integrally with the fourth lens unit G4.

During a change of magnification from the short focal end (wide-angle end) to the long focal end (telephoto end), the first lens unit G1 is stationary, the second lens unit G2 is moved to the image side, the third lens unit G3 is moved, and the fourth lens unit G4 is stationary. As a result, the lens units are moved so that the interval between the first lens unit G1 and the second lens unit G2 becomes large and the interval between the second lens unit G2 and the third lens unit G3 becomes small.

In the third embodiment of the present invention illustrated in FIGS. 9A to 9C, the first lens unit G1 of the zoom lens according to Example 3 is configured to include, in order from the object side, a negative lens L11 which is configured with a negative meniscus lens directing the concave surface toward the image surface side, a positive lens L12 which is configured with a biconvex lens directing the convex surface having a large curvature from the image surface side toward the object side, and a positive lens L13 which is configured with a positive meniscus lens directing the convex surface toward the object side.

A laminated-type diffraction optical element is configured to be in close contact with the lens surface of the first lens unit G1, in the case of this example, a cemented surface.

In addition, the two lenses of the negative lens L11 and the positive lens L12 of the first lens unit G1 are closely adhered to each other to be integrally cemented, so that a two-sheet cemented lens is formed.

The second lens unit G2 is configured to include, in order from the object side, a negative lens L21 which is configured with a negative meniscus lens directing the concave surface toward the image surface side, a negative lens L22 which is configured with a biconcave lens directing the concave surface having a large curvature from the surface of the object side toward the image surface side, a positive lens L23 which is configured with a biconvex lens directing the convex surface having a large curvature from the surface of the object side toward the image surface side, and a negative lens L24 which is configured with a negative meniscus lens directing the concave surface toward the object side.

The third lens unit G3 is configured to include, in order from the object side, a negative lens L31 which is configured with a biconcave lens directing the concave surface having a large curvature from the surface of the image surface side toward the object side and a positive lens L32 which is configured with a plano-convex lens directing the convex surface having a large curvature from the image surface side toward the object side.

In addition, the two lenses of the negative lens L31 and the positive lens L32 of the third lens unit G3 are closely adhered to each other to be integrally cemented, so that a two-sheet cemented lens is formed.

A stop AD and various filters F such as an ND filter which is adjacent to the stop AD and is configured with parallel plate are inserted between the third lens unit G3 and the fourth lens unit G4 to be retained integrally with the fourth lens unit G4.

In the fourth lens unit G4, the 4a-th lens unit G4a which is arranged at the object side from the position having the largest interval in the fourth lens unit G4 is configured to include, in order from the object side, a positive lens L4a1 which is configured with a positive meniscus lens directing the convex surface toward the image surface side, a positive lens L4a2 which is configured with a biconvex lens directing the convex surface having a large curvature from the surface of the object side toward the image surface side, a positive lens L4a3 which is configured with a biconvex lens directing the convex surface having a large curvature from the surface of the image surface side toward the object side, a negative lens L4a4 which is configured with a biconcave lens directing the concave surface having a large curvature from the surface of the image surface side toward the object side, and a positive lens L4a5 which is configured with a positive meniscus lens directing the convex surface toward the object side.

In addition, the positive lens L4a3 and the negative lens L4a4 of the 4a-th lens unit G4a are closely adhered to each other to be integrally cemented, so that a two-sheet cemented lens is formed.

In the fourth lens unit G4, the 4b-th lens unit G4b which is arranged at the image surface side from the position having the largest interval in the fourth lens unit G4 is configured to include, in order from the object side, a negative lens L4b1 which is configured with a negative meniscus lens directing the concave surface toward the image surface side and a positive lens L4b2 which is configured with a biconvex lens directing the convex surface having a large curvature from the image surface side toward the object side.

In addition, various optical filters such as an optical low pass filter or an IR cutoff filter or a cover glass (seal glass) for an image-receiving/imaging element such as a CMOS image sensor or a CCD image sensor are assumed to be arranged at the image surface side of the 4a-th lens unit G4a. Herein, a filter or the like FG illustrated as an equivalent transparent parallel plate is arranged.

In this case, as illustrated in FIGS. 9A to 9C, during change of magnification from the short focal end to the long focal end, the first lens unit G1 is stationary, the second lens unit G2 is moved to the image side, the third lens unit G3 is moved, and the fourth lens unit G4 is stationary. As a result, the interval between the first lens unit G1 and the second lens unit G2 becomes large, and the interval between the second lens unit G2 and the third lens unit G3 becomes small.

It is preferable that focusing be performed by using the first lens unit G1.

In Example 3, the focal length f of the entire optical system, the F number F, and the half angle of view ω are changed in the respective ranges of f=7.72~29.99~116.36, F=1.64~1.64~1.92, and ω=31.42~8.08~2.10 by the zooming from the short focal end to the long focal end. Optical characteristics of each optical element are as listed in the following Table 9.

TABLE 9

|    | R         | D     | n       | ν     | Glass            |
|----|-----------|-------|---------|-------|------------------|
| 1  | 135.170   | 2.50  | 1.73800 | 32.26 | D-NBH53(OHARA)   |
| 2  | 52.969    | 14.14 | 1.65160 | 58.55 | S-LAL7(OHARA)    |
| 3  | −512.065  | 0.50  |         |       |                  |
| 4  | 54.857    | 7.05  | 1.49700 | 81.54 | S-FPL51(OHARA)   |
| 5  | 225.970   | DA    |         |       |                  |
| 6  | 827.259   | 1.20  | 1.90366 | 31.31 | TAFD25(HOYA)     |
| 7  | 18.437    | 5.00  |         |       |                  |
| 8  | −104.271  | 1.20  | 1.67003 | 47.23 | S-BAH10(OHARA)   |
| 9  | 17.709    | 3.73  | 1.92286 | 18.90 | S-NH2(OHARA)     |
| 10 | 150.386   | 2.29  |         |       |                  |
| 11 | −32.639   | 1.20  | 1.83481 | 42.72 | S-LAH55V(OHARA)  |
| 12 | −72.128   | DB    |         |       |                  |
| 13 | −30.825   | 1.20  | 1.83400 | 37.16 | S-LAH60(OHARA)   |
| 14 | 40.910    | 2.18  | 1.92286 | 18.90 | S-NPH2(OHARA)    |
| 15 | −1193.406 | DC    |         |       |                  |
| 16 | Stop      | 0.50  |         |       |                  |
| 17 | 0.000     | 0.80  | 1.51633 | 64.14 | S-BSL7(OHARA)    |
| 18 | 0.000     | 0.50  |         |       |                  |
| 19 | −6057.603 | 3.35  | 1.69350 | 53.20 | S-LAL13(OHARA)   |
| 20 | −29.936   | 0.50  |         |       |                  |
| 21 | 59.682    | 3.57  | 1.49700 | 81.54 | S-FPL51(OHARA)   |
| 22 | −46.083   | 0.50  |         |       |                  |
| 23 | 26.178    | 4.98  | 1.49700 | 81.54 | S-FPL51(OHARA)   |
| 24 | −27.140   | 1.20  | 1.84666 | 23.78 | S-TIH53(OHARA)   |
| 25 | 55.682    | 0.50  |         |       |                  |
| 26 | 16.000    | 2.85  | 1.67270 | 32.10 | S-TIM25(OHARA)   |
| 27 | 32.744    | 10.38 |         |       |                  |
| 28 | 16.462    | 1.20  | 1.83481 | 42.72 | S-LAH55V(OHARA)  |
| 29 | 9.175     | 2.02  |         |       |                  |
| 30 | 24.401    | 2.53  | 1.58267 | 46.42 | S-BAM3(OHARA)    |
| 31 | −35.047   | 11.10 |         |       |                  |
| 32 | 0.000     | 2.70  | 1.49782 | 67.00 | Filter or the like |
| 33 | 0.000     | —     |         |       |                  |

In Example 3, variable amounts such as the focal length f of the entire optical system, the F value, the half angle of view ω, the variable interval DA between the first lens unit G1 and the second lens unit G2, the variable interval DB between the second lens unit G2 and the third lens unit G3, the variable interval DC between the third lens unit G3 and the stop AD, and the like are changed according to zooming as listed in the following Table 10.

TABLE 10

|          | Wide    | Mean    | Tele    |
|----------|---------|---------|---------|
| f        | 7.72    | 29.99   | 116.36  |
| F Number | 1.64    | 1.64    | 1.92    |
| ω        | 31.42   | 8.08    | 2.10    |
| DA       | 1.5000  | 37.4928 | 54.0739 |
| DB       | 53.5369 | 12.0768 | 2.5597  |
| DC       | 2.5970  | 8.0642  | 1.0000  |

When the coefficients of the second-order and fourth-order terms of the phase function are denoted by C2 and C4, respectively, the focal length fdoe of the diffraction plane is expressed by:

$$fdoe = -1/(2 \times C2).$$

In Example 3, the coefficient C2 of the second-order term of the phase function of the diffraction plane formed on the second surface, that is, the cemented surface between the negative lens L11 and the positive lens L12 is as listed in the following Table 11. In addition, the coefficient C4 of the fourth-order term of the phase function is also listed.

TABLE 11

Coefficient of Phase Function

| λ | C2 | C4 |
|---|---|---|
| 2 | 587.6 | −4.45671E−05 | 1.24359E−08 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d(C2 \cdot h^2 + C4 \cdot h^4)$$

In the case of Example 3, the values corresponding to the aforementioned condition formulas (1) to (9) are as listed in the following Table 12 and satisfy the respective condition formulas (1) to (9). Particularly, in the 4a-th lens unit G4a, both the positive lens L4a2 and the positive lens L4a3 satisfy the condition formulas (1), (2), (3), and (6).

TABLE 12

Condition Formula

| L4a2 | $n_d$ | (1) | 1.49700 |
|---|---|---|---|
| | $v_d$ | (2) | 81.54 |
| | $P_{gF} - (-0.001802 \times v_d + 0.6483)$ | (3) | 0.036 |
| L4a3 | $n_d$ | (1) | 1.49700 |
| | $v_d$ | (2) | 81.54 |
| | $P_{gF} - (-0.001802 \times v_d + 0.6483)$ | (3) | 0.036 |
| f1doe/f1 | | (4) | 132.95 |
| f1doe/ft | | (4') | 96.42 |
| Da/D4 | | (5) | 0.29 |
| L4a2 | f4p/f4 | (6) | 2.68 |
| L4a3 | f4p/f4 | (6) | 1.40 |
| (R1 − R2)/(R1 + R2) | | (7) | 0.27 |
| D4b/D4a | | (8) | 0.30 |
| f4/ft | | (9) | 0.17 |

In addition, in the case of a modified example of Example 3, the values corresponding to the aforementioned condition formulas (1) to (10) are as listed in the following Table 12 and satisfy the respective condition formulas (1) to (10).

TABLE 12A

Condition Formula

| L3 | $n_d$ | (1) | 1.49700 |
|---|---|---|---|
| | $v_d$ | (2) | 81.54 |
| | $P_{gF} - (-0.001802 \times v_d + 0.6483)$ | (3) | 0.036 |
| | fdoe/f1 | (4) | 132.95 |
| | f1doe/ft | (4') | 96.42 |
| | f1/ft | (5A) | 0.73 |
| | f11/f1 | (6A) | −1.42 |
| | f12/f1 | (7A) | 0.88 |
| | f13/f1 | (8A) | 1.70 |
| | D1/ft | (9A) | 0.21 |
| | f4/ft | (10) | 0.17 |

Figure 10:
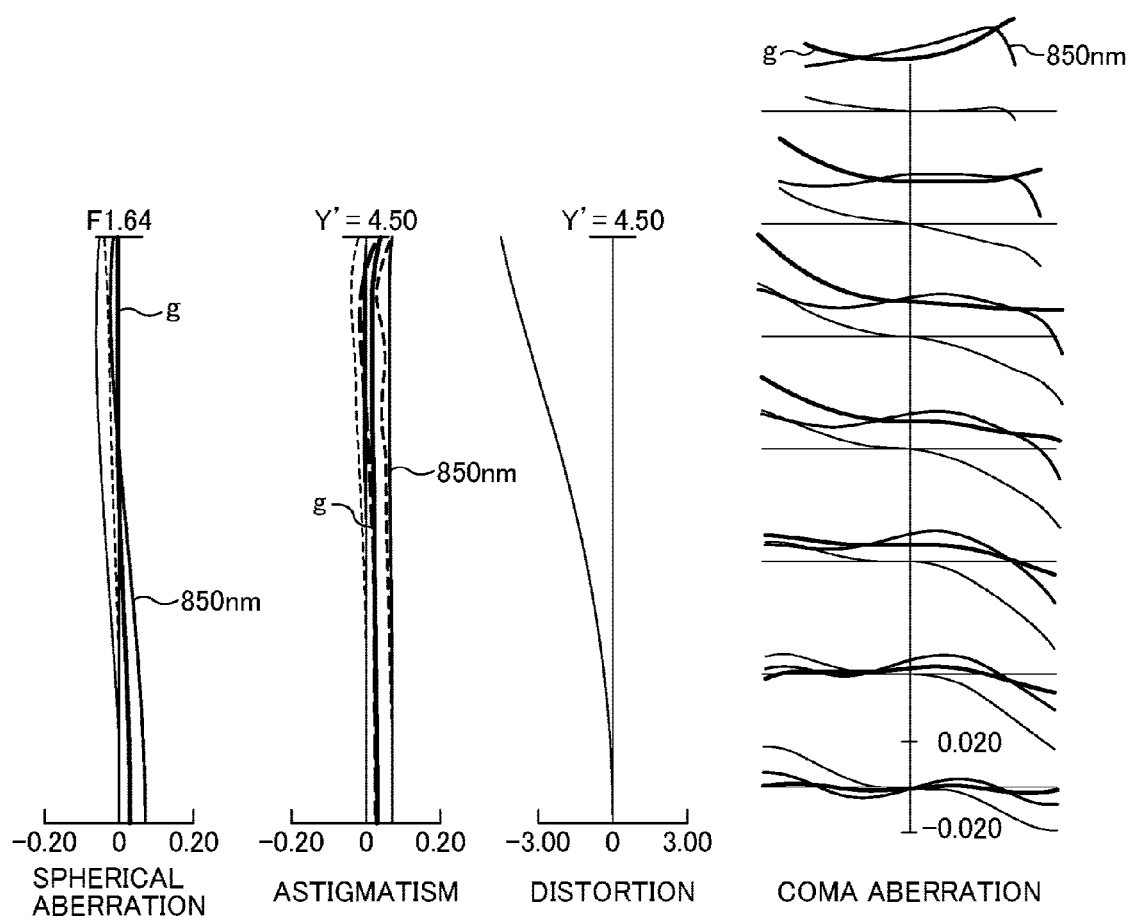
FIG. 10 is an aberration graph illustrating spherical aberration, astigmatism, distortion aberration, and comatic aberration at the short focal end of the zoom lens according to Example 3 of the present invention illustrated in FIGS. 9A to 9C.
Figure 11:
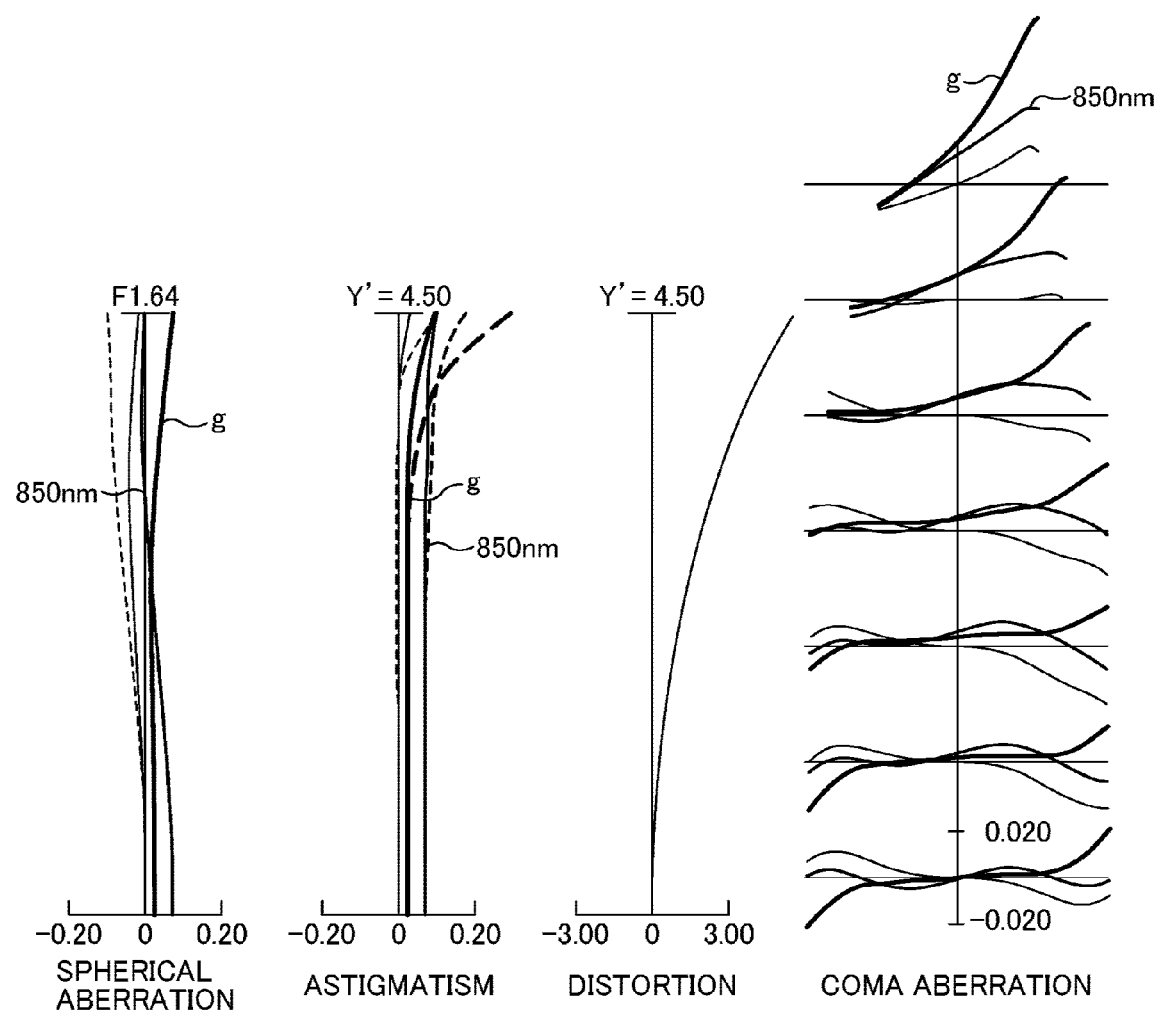
FIG. 11 is an aberration graph illustrating spherical aberration, astigmatism, distortion aberration, and comatic aberration at the intermediate focal length of the zoom lens according to Example 3 of the present invention illustrated in FIGS. 9A to 9C.
Figure 12:
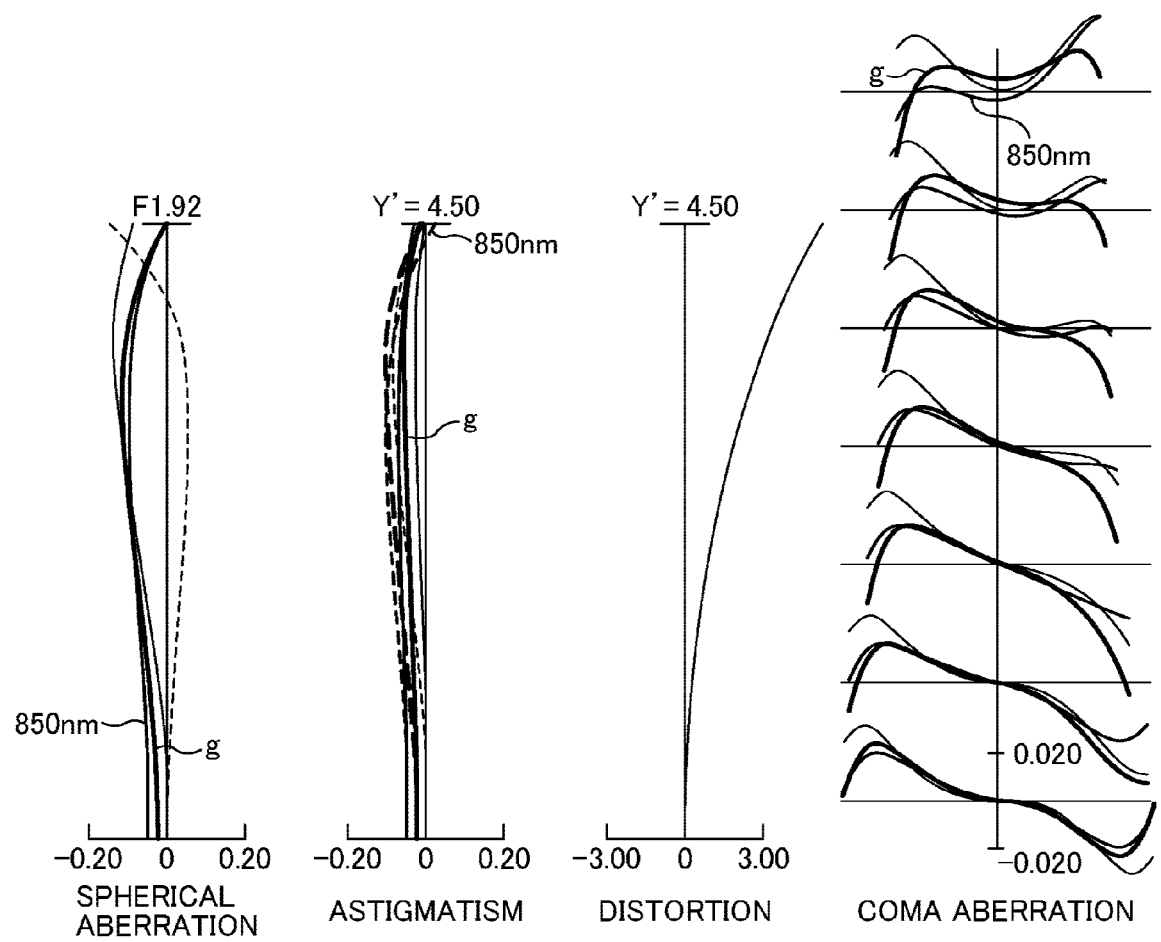
FIG. 12 is an aberration graph illustrating spherical aberration, astigmatism, distortion aberration, and comatic aberration at the long focal end of the zoom lens according to Example 3 of the present invention illustrated in FIGS. 9A to 9C.

In addition, FIG. 10, FIG. 11, and FIG. 12 illustrate aberration graphs of spherical aberration, astigmatism, distortion aberration, and comatic aberration at the short focal end (wide-angle end), the intermediate focal length, and the long focal end (telephoto end) of Example 3, respectively. In addition, in the aberration graphs, a broken line of the spherical aberration graph indicates a sinusoidal condition; and a solid line and a broken line of the astigmatism graph indicate sagittal and meridional, respectively. The same is also applied in aberration graphs of other examples.

As obvious from FIGS. 10 to 12, in the zoom lens according to Example 3, the aberrations are sufficiently corrected. Since the example may be adapted to an image receiving element of 1 mega to 5 mega pixels, it is obvious that, as the zoom lens is configured according to Example 3, it is possible to achieve a sufficiently small size and to secure a very excellent imaging performance.

EXAMPLE 4

Figure 13A:
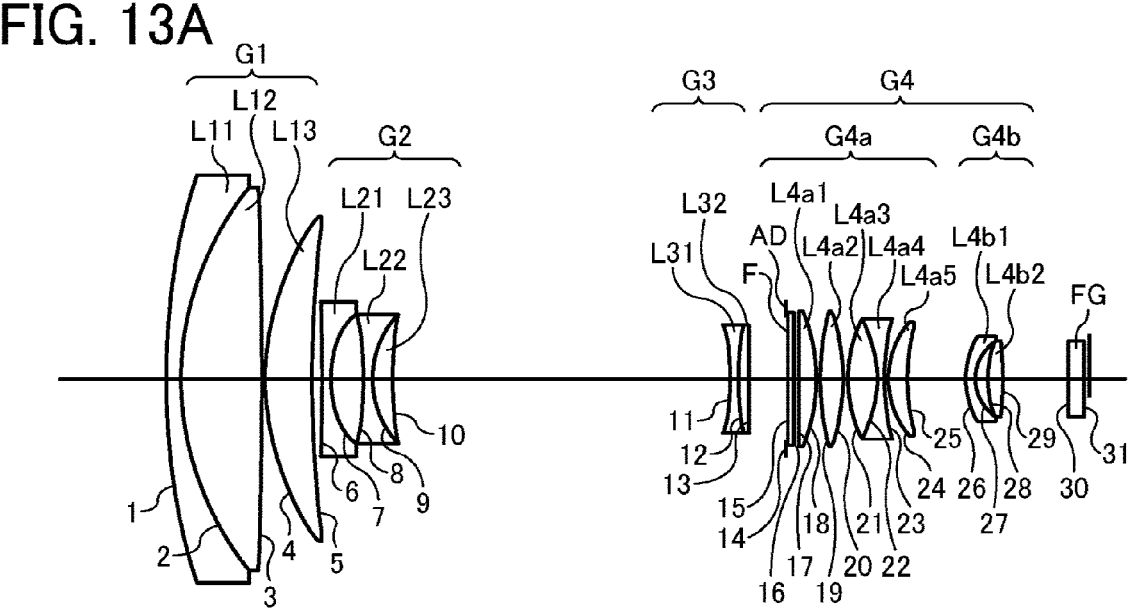
FIGS. 13A, 13B, and 13C are schematic diagrams illustrating a configuration of an optical system and a zoom locus involved with zooming of a zoom lens according to Example 4 of a fourth embodiment of the present invention.
Figure 13B:
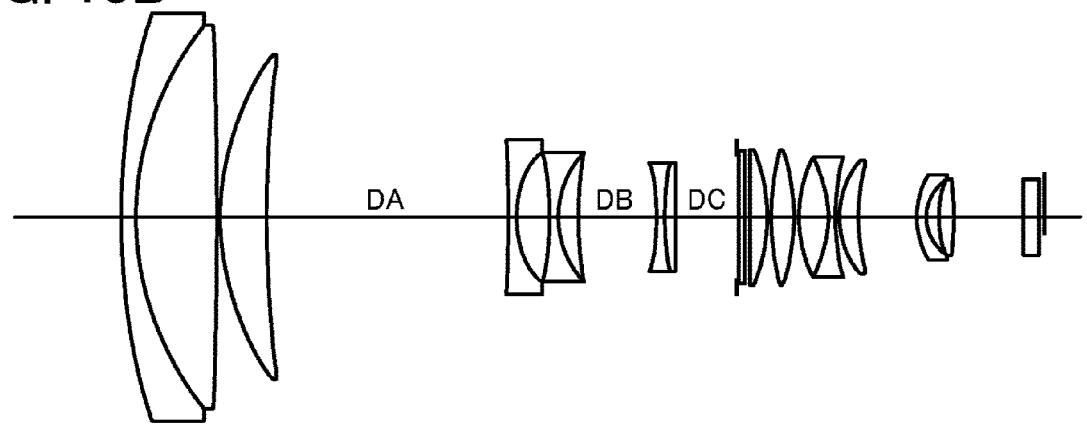
Figure 13C:
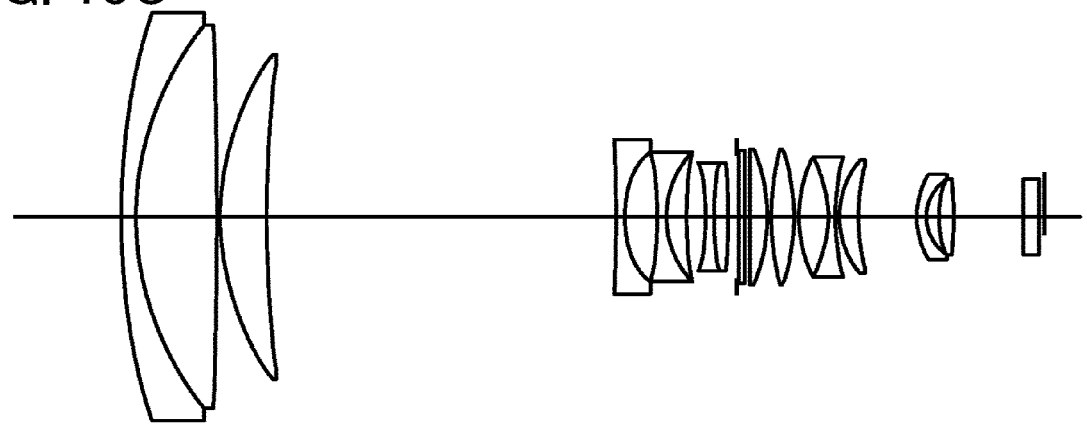

FIGS. 13A, 13B, and 13C illustrate a lens configuration of an optical system and a zoom locus involved with zooming from a short focal end, that is, a wide-angle end, through a predetermined intermediate focal length to a long focal end, that is, a telephoto end according to the zoom lens according to Example 4 of the fourth embodiment of the present invention, FIG. 13A is a cross-sectional diagram illustrating the short focal end, that is, the wide-angle end, FIG. 13B is a cross-sectional diagram illustrating the predetermined intermediate focal length, and FIG. 13C is a cross-sectional diagram illustrating the long focal end, that is, the telephoto end. In addition, in FIGS. 13A to 13C illustrating the arrangement of the lens unit of Example 4, the left side of the illustration is the object side (subject side).

The zoom lens illustrated in FIGS. 13A to 13C is configured to include, in order from the object side, a first lens unit G1 having a positive refractive power, a second lens unit G2 having a negative refractive power, a third lens unit G3 having a negative refractive power, and a fourth lens unit G4 having a positive refractive power.

The fourth lens unit G4 is configured to include a 4a-th lens unit G4a which is arranged at the object side from the position having the largest interval in the fourth lens unit G4 and a 4b-th lens unit G4b which is arranged at the image side.

The first to fourth lens units G1 to G4 are supported by an appropriate common support frame or the like for each unit; during the zooming or the like, each unit of the second lens unit G2 and the third lens unit G3 is integrally operated; and the stop AD is retained in the fourth lens unit G4.

During a change of magnification from the short focal end (wide-angle end) to the long focal end (telephoto end), the first lens unit G1 is stationary, the second lens unit G2 is moved to the image side, the third lens unit G3 is moved, and the fourth lens unit G4 is stationary. As a result, the lens units are moved so that the interval between the first lens unit G1 and the second lens unit G2 becomes large, and the interval between the second lens unit G2 and the third lens unit G3 becomes small.

In the fourth embodiment of the present invention illustrated in FIGS. 13A to 13C, the first lens unit G1 of the zoom lens according to Example (numerical example: hereinafter, the same is applied) 4 is configured to include, in order from the object side, a negative lens L11 which is configured with a negative meniscus lens directing the concave surface toward the image surface side, a positive lens L12 which is configured with a biconvex lens directing the convex surface having a large curvature from the image surface side toward the object side, and a positive lens L13 which is configured with a positive meniscus lens directing the convex surface toward the object side.

A laminated-type diffraction optical element is configured to be in close contact with the lens surface of the first lens unit G1, in the case of this example, a cemented surface In addition, the two lenses of the negative lens L11 and the positive lens L12 of the first lens unit G1 are closely adhered to each other to be integrally cemented, so that a two-sheet cemented lens is formed.

The second lens unit G2 is configured to include, in order from the object side, a negative lens L21 which is configured with a biconcave lens directing the concave surface having a large curvature from the object side toward the image surface side, a negative lens L22 which is configured with a biconcave lens directing the concave surface having a large curvature from the surface of the object side toward the image surface side, and a positive lens L23 which is configured with a positive meniscus lens directing the convex surface toward the object side.

The third lens unit G3 is configured to include, in order from the object side, a negative lens L31 which is configured with a biconcave lens directing the concave surface having a large curvature from the surface of the image surface side toward the object side and a positive lens L32 which is configured with a plano-convex lens directing the convex surface having a large curvature from the image surface side toward the object side.

In addition, the two lenses of the negative lens L31 and the positive lens L32 of the third lens unit G3 are closely adhered to each other to be integrally cemented, so that a two-sheet cemented lens is formed.

A stop AD and various filters F such as an ND filter which is adjacent to the stop AD and is configured with parallel plate are inserted between the third lens unit G3 and the fourth lens unit G4 to be retained integrally with the fourth lens unit G4.

In the fourth lens unit G4, the 4a-th lens unit G4a which is arranged at the object side from the position having the largest interval in the fourth lens unit G4 is configured to include, in order from the object side, a positive lens L4a1 which is configured with a biconvex lens directing the convex surface having a large curvature from the surface of the object side toward the image surface side, a positive lens L4a2 which is configured with a biconvex lens directing the convex surface having a large curvature from the surface of the object side toward the image surface side, a positive lens L4a3 which is configured with a biconvex lens directing the convex surface having a large curvature from the surface of the image surface side toward the object side, a negative lens L4a4 which is configured with a biconcave lens directing the concave surface having a large curvature from the surface of the image surface side toward the object side, and a positive lens L4a5 which is configured with a positive meniscus lens directing the convex surface toward the object side.

In addition, the positive lens L4a3 and the negative lens L4a4 of the 4a-th lens unit G4a are closely adhered to each other to be integrally cemented, so that a two-sheet cemented lens is formed.

In the fourth lens unit G4, the 4b-th lens unit G4b which is arranged at the image surface side from the position having the largest interval in the fourth lens unit G4 is configured to include, in order from the object side, a negative lens L4b1 which is configured with a negative meniscus lens directing the concave surface toward the image surface side and a positive lens L4b2 which is configured with a biconvex lens directing the convex surface having a large curvature from the image surface side toward the object side.

In addition, various optical filters such as an optical low pass filter or an IR cutoff filter or a cover glass (seal glass) for an image-receiving/imaging element such as a CMOS image sensor or a CCD image sensor are assumed to be arranged at the image surface side of the 4a-th lens unit G4a. Herein, a filter or the like FG illustrated as an equivalent transparent parallel plate is arranged.

In this case, as illustrated in FIGS. 13A to 13C, during a change of magnification from the short focal end to the long focal end, the first lens unit G1 is stationary, the second lens unit G2 is moved to the image side, the third lens unit G3 is moved, and the fourth lens unit G4 is stationary. As a result, the interval between the first lens unit G1 and the second lens unit G2 becomes large, and the interval between the second lens unit G2 and the third lens unit G3 becomes small.

It is preferable that focusing be performed by using the first lens unit G1.

In Example 4, the focal length f of the entire optical system, the F number F, and the half angle of view ω are changed in the respective ranges of f=7.72~30.00~116.40, F=1.64~1.64~1.92, and ω=31.38~8.09~2.11 by the zooming from the short focal end to the long focal end. Optical characteristics of each optical element are as listed in the following Table 13.

TABLE 13

| | R | D | n | ν | Glass |
|---|---|---|---|---|---|
| 1 | 130.295 | 2.50 | 1.73800 | 32.26 | S-NBH53(OHARA) |
| 2 | 56.670 | 13.51 | 1.58913 | 61.13 | S-BAL35(OHARA) |
| 3 | −393.318 | 0.50 | | | |
| 4 | 54.962 | 7.28 | 1.49700 | 81.54 | S-FPL51(OHARA) |
| 5 | 261.097 | DA | | | |
| 6 | −428.130 | 1.20 | 1.90366 | 31.31 | TAFD25(HOYA) |
| 7 | 17.679 | 5.84 | | | |
| 8 | −47.695 | 1.20 | 1.48749 | 70.24 | S-FSLS(OHARA) |
| 9 | 19.696 | 3.12 | 1.92286 | 18.90 | S-NPH2(OHARA) |
| 10 | 59.848 | DB | | | |
| 11 | −29.192 | 1.20 | 1.83400 | 37.16 | S-LAH60(OHARA) |
| 12 | 42.369 | 206 | 1.92286 | 18.90 | S-NPH2(OHARA) |
| 13 | −1545.888 | DC | | | |
| 14 | Stop | 0.48 | | | |
| 15 | 0.000 | 0.80 | 1.51633 | 64.14 | S-BSL7(OHARA) |
| 16 | 0.000 | 0.50 | | | |
| 17 | 2817.348 | 3.12 | 1.69680 | 55.53 | S-LAL14(OHARA) |
| 18 | −34.926 | 0.50 | | | |
| 19 | 55.357 | 4.14 | 1.49700 | 81.54 | S-FPL51(OHARA) |
| 20 | −37.058 | 0.50 | | | |
| 21 | 25.355 | 5.14 | 1.49700 | 81.54 | S-FPL51(OHARA) |
| 22 | −26.330 | 1.20 | 1.90366 | 31.31 | TAFD 25 (HOYA) |
| 23 | 49.573 | 0.50 | | | |
| 24 | 16.419 | 3.00 | 1.73400 | 51.47 | S-LAL59(OHARA) |
| 25 | 38.909 | 9.50 | | | |
| 26 | 14.721 | 1.25 | 1.83400 | 37.16 | S-LAH60(OHARA) |
| 27 | 8.660 | 2.17 | | | |
| 28 | 24.862 | 250 | 1.51742 | 52.43 | S-NSL36(OHARA) |
| 29 | −33.644 | 11.10 | | | |
| 30 | 0.000 | 2.70 | 1.49782 | 67.00 | |
| 31 | 0.000 | | | | |

In Example 4, variable amounts such as the focal length f of the entire optical system, the F value, the half angle of view ω, the variable interval DA between the first lens unit G1 and the second lens unit G2, the variable interval DB between the second lens unit G2 and the third lens unit G3, the variable interval DC between the third lens unit G3 and the stop AD, and the like are changed according to zooming as listed in the following Table 14.

TABLE 14

|  | Wide | Mean | Tele |
|---|---|---|---|
| f | 7.72 | 30.00 | 116.40 |
| F Number | 1.64 | 1.64 | 1.92 |
| ω | 31.38 | 8.09 | 2.11 |
| DA | 1.5000 | 38.9996 | 56.4774 |
| DB | 54.7832 | 12.9000 | 3.5117 |
| DC | 5.2059 | 9.5894 | 1.5000 |

When the coefficients of the second-order and fourth-order terms of the phase function are denoted by C2 and C4, respectively, the focal length fdoe of the diffraction plane is expressed by:

$$fdoe = -1/(2 \times C2).$$

In Example 4, the coefficient C2 of the second-order term of the phase function of the diffraction plane formed on the second surface, that is, the cemented surface between the negative lens L11 and the positive lens L12 is as listed in the following Table 15. In addition, the coefficient C4 of the fourth-order term of the phase function is also listed.

TABLE 15

| Coefficient of Phase Function | | |
|---|---|---|
| λ | C2 | C4 |
| 2 587.6 | −4.35505E−05 | 1.15020E−08 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d \cdot (C2 \cdot h^2 + C4 \cdot h^4).$$

In the case of Example 4, the values corresponding to the aforementioned condition formulas (1) to (9) are as listed in the following Table 16 and satisfy the respective condition formulas (1) to (9). Particularly, in the 4a-th lens unit G4a, both the positive lens L4a2 and the positive lens L4a3 satisfy the condition formulas (1), (2), (3), and (6).

TABLE 16

| Condition Formula | | | | |
|---|---|---|---|---|
| L4a2 | $n_d$ | | (1) | 1.49700 |
|  | $v_d$ | | (2) | 81.54 |
|  | $P_{gF} - (-0.001802 \times v_d + 0.6483)$ | | (3) | 0.036 |
| L4a3 | $n_d$ | | (1) | 1.49700 |
|  | $v_d$ | | (2) | 81.54 |
|  | $P_{gF} - (-0.001802 \times v_d + 0.6483)$ | | (3) | 0.036 |
| f1doe/f1 | | | (4) | 133.03 |
| f1doe/ft | | | (4') | 98.63 |
| Da/D4 | | | (5) | 0.27 |
| L4a2 | f4p/f4 | | (6) | 2.31 |
| L4a3 | f4p/f4 | | (6) | 1.37 |
| (R1 − R2)/(R1 + R2) | | | (7) | 0.31 |
| D4b/D4a | | | (8) | 0.31 |
| f4/ft | | | (9) | 0.17 |

In addition, in the case of a modified example of Example 4, the values corresponding to the aforementioned condition formulas (1) to (10) are as listed in the following Table 16A and satisfy the respective condition formulas (1) to (10).

TABLE 16A

| Condition Formula | | | |
|---|---|---|---|
| L3 | $n_d$ | (1) | 1.49700 |
|  | $v_d$ | (2) | 81.54 |
|  | $P_{gF} - (-0.001802 \times v_d + 0.6483)$ | (3) | 0.036 |
| fdoe/f1 | | (4) | 133.03 |
| f1doe/ft | | (4') | 98.63 |
| f1/ft | | (5A) | 0.74 |
| f11/f1 | | (6A) | −1.60 |
| f12/f1 | | (7A) | 0.99 |
| f13/f1 | | (8A) | 1.60 |
| D1/ft | | (9A) | 0.20 |
| f4/ft | | (10) | 0.17 |

Figure 14:
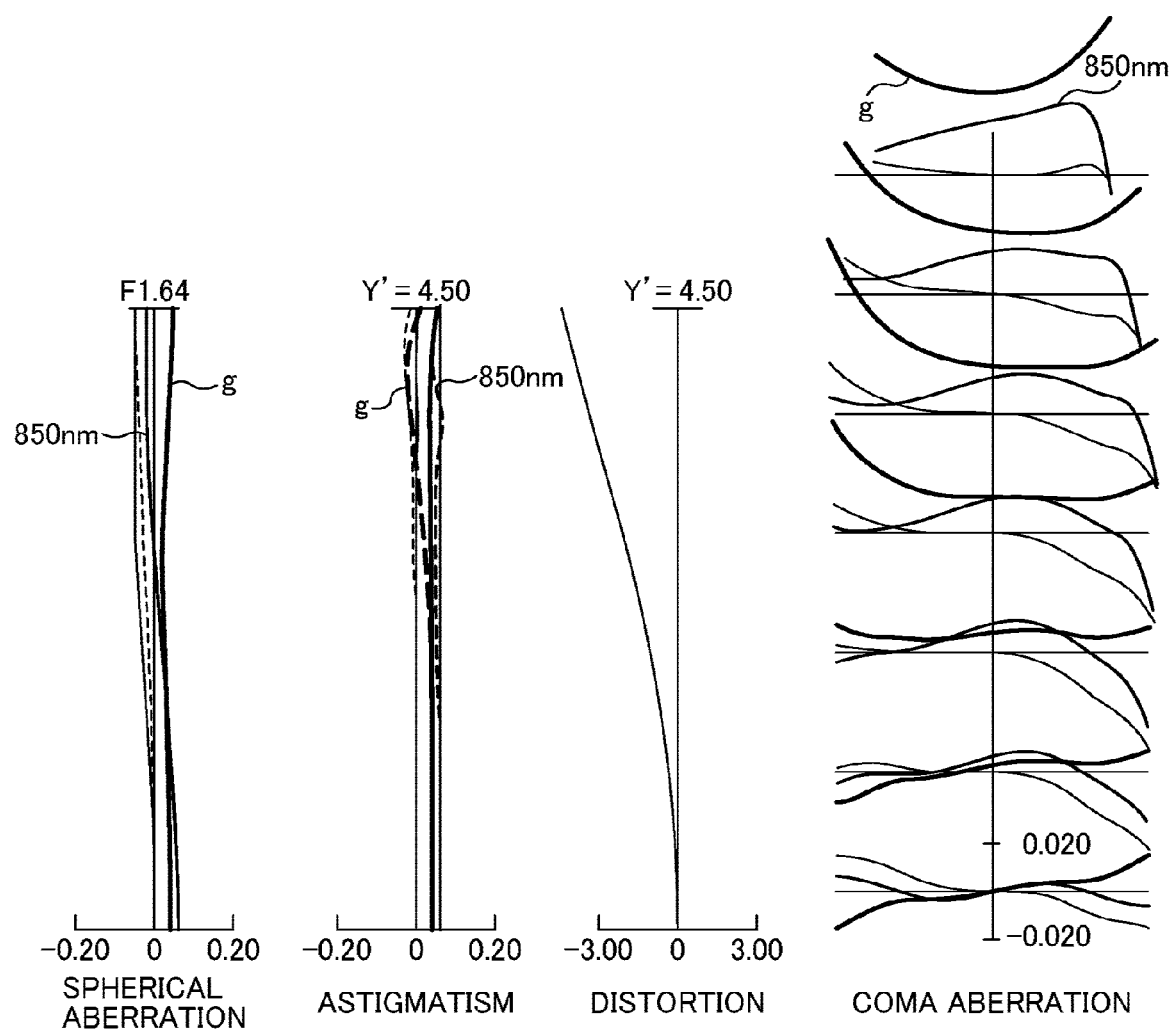
FIG. 14 is an aberration graph illustrating spherical aberration, astigmatism, distortion aberration, and comatic aberration at the short focal end of the zoom lens according to Example 4 of the present invention illustrated in FIGS. 13A to 13C.
Figure 15:
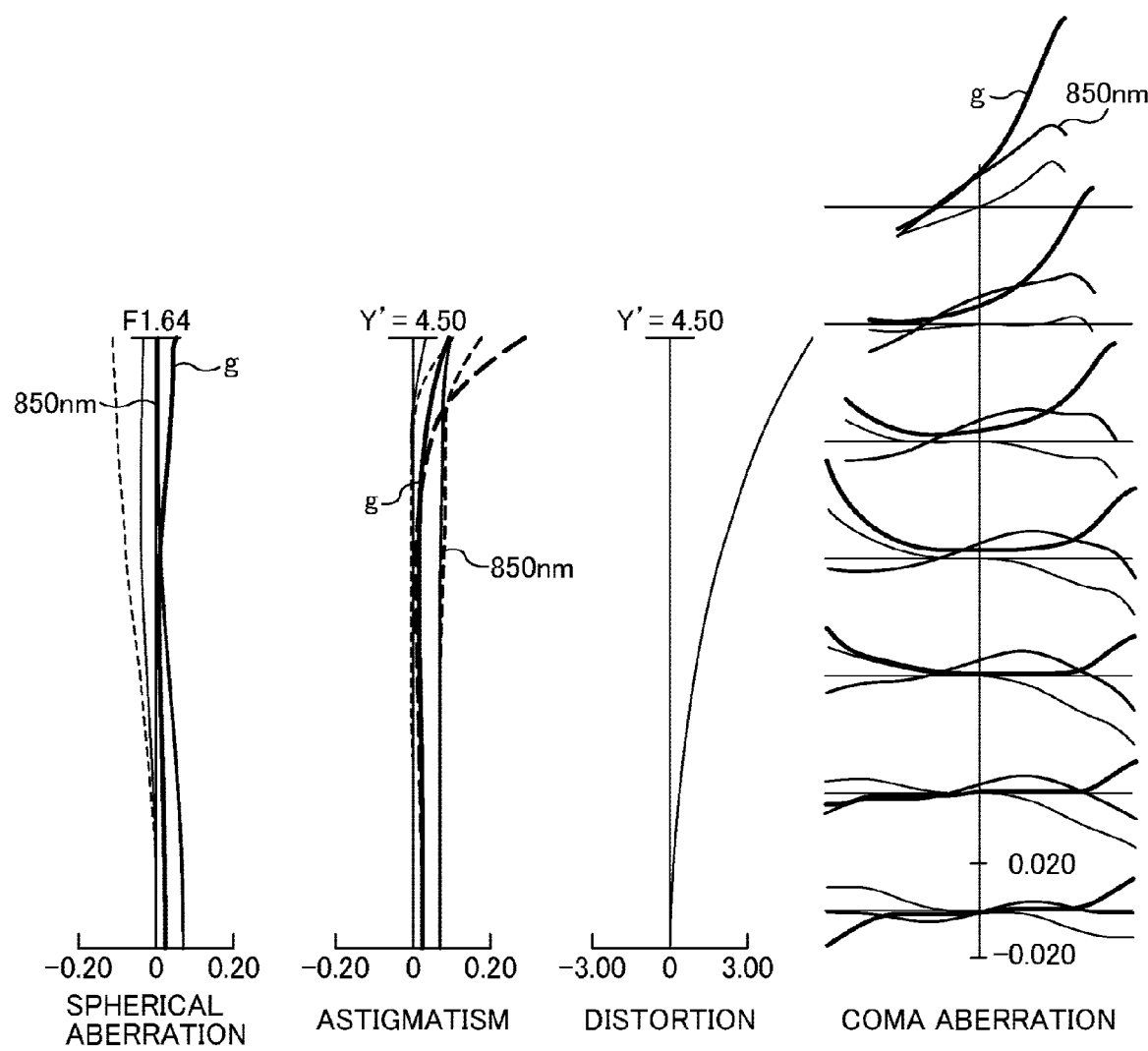
FIG. 15 is an aberration graph illustrating spherical aberration, astigmatism, distortion aberration, and comatic aberration at the intermediate focal length of the zoom lens according to Example 4 of the present invention illustrated in FIGS. 13A to 13C.
Figure 16:
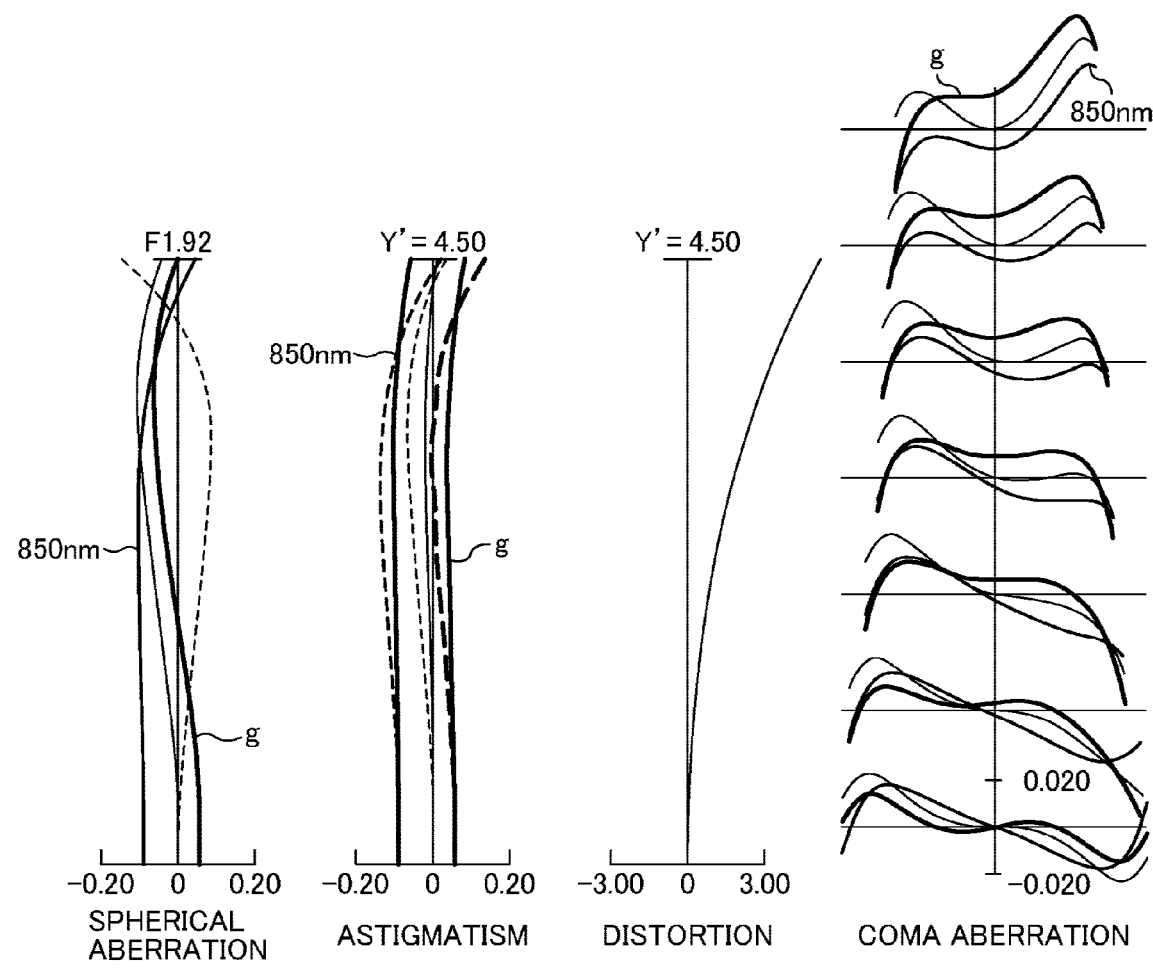
FIG. 16 is an aberration graph illustrating spherical aberration, astigmatism, distortion aberration, and comatic aberration at the long focal end of the zoom lens according to Example 4 of the present invention illustrated in FIGS. 13A to 13C.

In addition, FIG. 14, FIG. 15, and FIG. 16 illustrate aberration graphs of spherical aberration, astigmatism, distortion aberration, and comatic aberration at the short focal end (wide-angle end), the intermediate focal length, and the long focal end (telephoto end) of Example 4, respectively. In addition, in the aberration graphs, a broken line of the spherical aberration graph indicates a sinusoidal condition; and a solid line and a broken line of the astigmatism graph indicate sagittal and meridional, respectively. The same is also applied in aberration graphs of other examples.

As obvious from FIGS. 14 to 16, in the zoom lens according to Example 4, the aberrations are sufficiently corrected. As the example may be adapted to an image receiving element of 1 mega to 5 mega pixels, it is obvious that, as the zoom lens is configured according to Example 4, it is possible to achieve a sufficiently small size and to secure a very excellent imaging performance.

Fifth Embodiment

Figure 17:
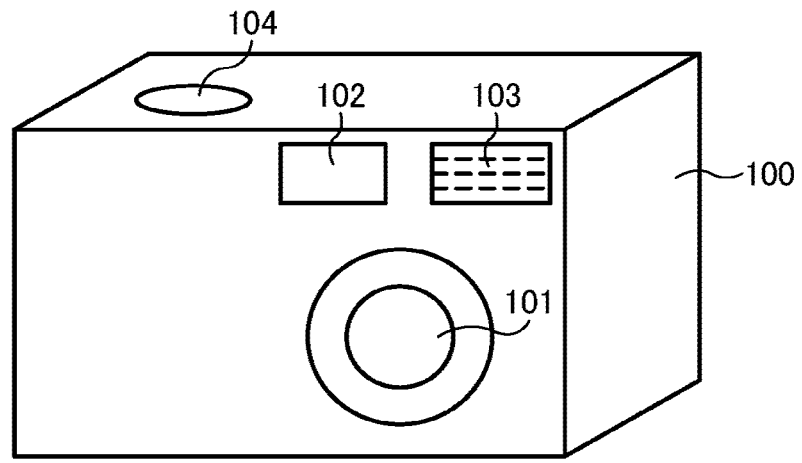
FIG. 17 is a schematic perspective diagram illustrating a configuration of outer appearance of a digital camera as a camera according to a fifth embodiment of the present invention as viewed from an object side.
Figure 18:
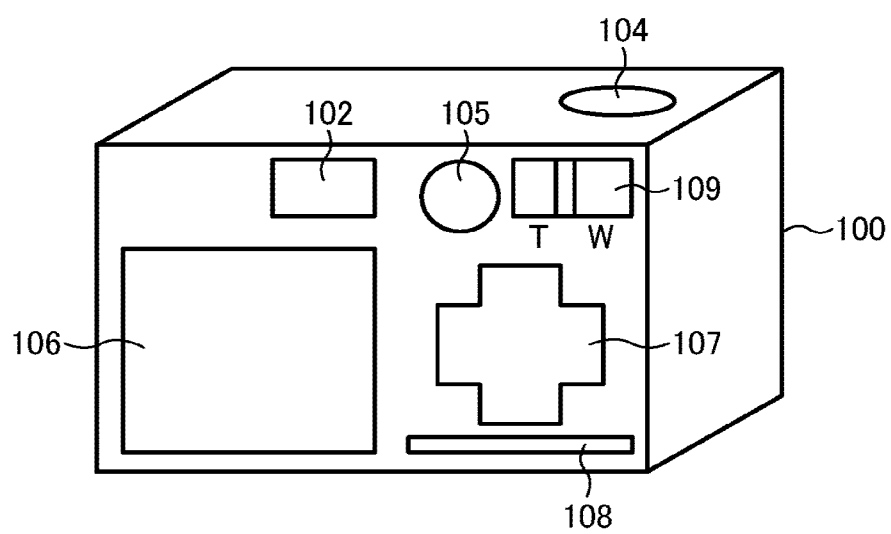
FIG. 18 is a schematic perspective diagram illustrating a configuration of outer appearance of the digital camera of FIG. 17 as viewed from a photographer's side.
Figure 19:
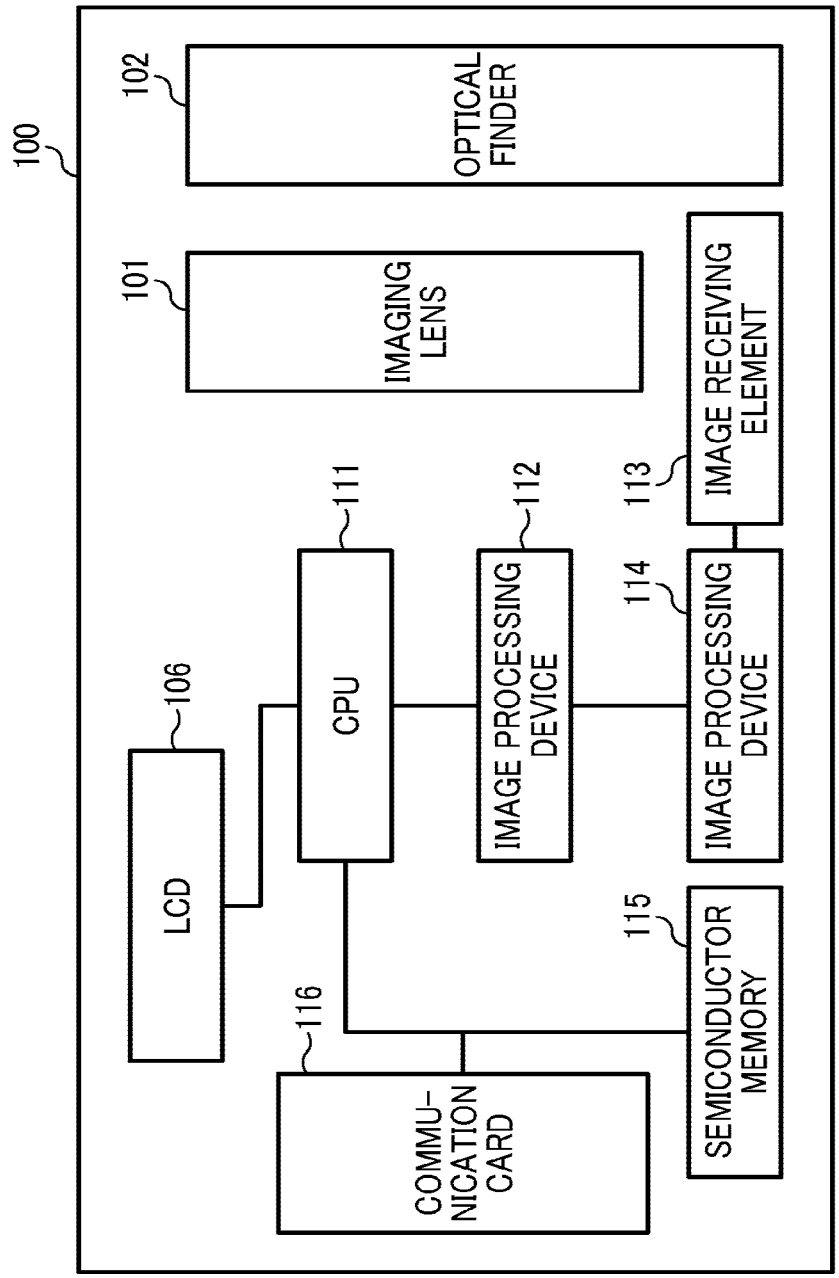
FIG. 19 is a block diagram illustrating a configuration of functions of the digital camera of FIGS. 17 and 18.

Next, a camera according to a fifth embodiment of the present invention where a zoom lens such as any one of the above-described zoom lenses is employed as a photographing optical system or a moving picture photographing optical system will be described with reference to FIGS. 17 to 19. FIG. 17 is a schematic perspective diagram illustrating the outer appearance of a digital camera, according to the fifth embodiment of the present invention, as viewed from an object side. FIG. 18 is a schematic perspective diagram illustrating the outer appearance of the digital camera as viewed from a photographer's side. FIG. 19 is a block diagram illustrating an electrical structure of the digital camera. In FIGS. 17 to 19, a digital camera is illustrated as an example of a camera including the above-described zoom lens. Alternatively, any desired apparatus may include the above-described zoom lens, such as an imaging device dedicated for imaging including a video camera for photographing a moving picture or a film camera using a so-call silver halide film, various information devices including a portable device such as a mobile phone, a portable information device such as a PDA (personal data assistant), a smart phone, or tablet device. Such an information device also includes substantially the same function and configuration as the digital camera having a slightly different outer appearance, so that the above-described zoom lenses according to the first to fourth embodiments of the present invention may be used as an imaging optical system of the information device.

As illustrated in FIGS. 17 and 18, the digital camera, which has a camera body 100, mainly includes an imaging lens (photographing lens) 101, an optical finder 102, a strobe (electronic flash light) 103, a shutter button 104, a power switch 105, a liquid crystal display (LCD) 106, a manipulation button 107, a memory card slot 108, and a zoom switch 109. As illustrated in FIG. 19, the digital camera further includes a central processing unit (CPU) 111, an image processing device 112, an image receiving element 113, a signal processing device 114, a semiconductor memory 115, and a communication card 116.

The digital camera includes an imaging lens 101 as an imaging optical system, and an image receiving element 113 which functions as an image sensor by using a CMOS (complementary metal oxide semiconductor) imaging element, a CCD (charge coupled device) imaging element, or the like to read an optical image of a subject focused by the imaging lens 101 by using the image receiving element 113. The zoom lenses according to any one of the above-described embodiments of the present invention may be used as the imaging lens 101.

The signal processing device 114 processes a signal output from the image receiving element 113 under control of the CPU 111, to convert the signal into digital image data. The image processing device 112 applies image processing on the image data digitalized by the signal processing device 114, under control of the CPU 111. The processed image data is stored in the semiconductor memory 115 such as a nonvolatile memory. In this case, the semiconductor memory 115 may be a memory card, which is inserted into the memory card slot 108 or a built-in semiconductor memory mounted on a board of the main body of the digital camera. The LCD 106 may display an image being generated while photographing, or an image stored in the semiconductor memory 115. The image stored in the semiconductor memory 115 may be transmitted to the outside through the communication card 116 inserted into a communication card slot, such as the memory card slot 108.

While carrying the camera, an object surface of the imaging lens 101 is covered with a lens barrier. As a user turns on the camera by manipulating the power switch 105, the lens barrier is opened so as to expose the object surface. At this time, inside a barrel of the imaging lens 101, optical systems of lens units of the zoom lens are arranged, for example, at the short focal end (wide-angle end), By manipulating the zoom switch 109, the arrangement of each lens unit of the optical systems are changed, so that operation of changing magnification through the intermediate focal length to the long focal end (telephoto end) may be performed.

It is preferable that an optical system of the optical finder 102 also perform changing magnification in cooperation with a change of an angle of view of the imaging lens 101.

In many cases, focusing is performed by half push manipulation of the shutter button 104.

The focusing of the zoom lenses according to the first to fourth embodiments of the present invention may be performed by movement of a portion of lens units of the optical systems of plural lens units constituting the zoom lens. If the shutter button 104 is further pushed into a full pushed state, photographing is performed, and after that, the above-described processes are performed.

In order to display the image recorded in the semiconductor memory 115 on the LCD 106 or to transmit the image through the communication card 116 to the outside, the manipulation button 107 is manipulated in a predetermined manner. The semiconductor memory 115 and the communication card 116 may be used in a state of being inserted into dedicated or general-purpose slot such as the memory card slot 108 or the communication card slot.

When the imaging lens 101 is in a retracted state, each lens unit of the focusing lens may not be necessarily arranged on the optical axis. For example, if the digital camera is configured with a mechanism where, at the retracting time, at least one of the second lens unit G2 and the third lens unit G3 is retracted from the optical axis and is accommodated together with other lens units, the digital camera may be made thinner.

As described above, in the information device having the same imaging device or the same imaging function as the above-described digital camera (camera), the imaging lens 101 which is configured by using the same zoom lenses of the first to fourth embodiments (Examples 1 to 4) may be used as a photographing optical system. Therefore, it is possible to implement an information device such as a portable information device having the same imaging device or the same imaging function as a small-sized, high-image-quality digital camera using image receiving elements of 1 mega to 5 mega pixels or more.

In addition, the configurations of the zoom lenses according to the first to fourth embodiments of the present invention may also be applied to a photographing lens of a traditional silver halide film camera or a projection lens of a projector, or any other desired apparatus desired to have the zoom lens.

What is claimed is:

1. A zoom lens comprising, in order from an object side:
a first lens unit having a positive refractive power;
a second lens unit having a negative refractive power;
a third lens unit having a negative refractive power; and
a fourth lens unit having a positive refractive power,
wherein, during a change of magnification from the short focal end to the long focal end, the first lens unit is stationary, the second lens unit is moved to an image side, the third lens unit is moved, and the fourth lens unit is stationary,
wherein the fourth lens unit is configured to include a first fourth lens unit which is arranged at the object side from a position having the largest interval in the fourth lens unit and a second fourth lens unit which is arranged at the image side,
wherein the first fourth lens unit is configured to include a positive lens satisfying the following condition formulas (1), (2), and (3),
wherein the first lens unit includes a diffraction plane and satisfies the following condition formula (4), $$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

$$50 < fdoe/f1 < 200 \quad (4)$$

where $n_d$ denotes a refractive index of the positive lens, $v_d$ denotes an Abbe number of the positive lens, $P_{g,F}$ denotes a partial dispersion ratio of the positive lens, fdoe is a focal length of the diffraction plane, and f1 denotes a focal length of the first lens unit, and wherein refractive indexes of g-line, F-line, and c-line of the positive lens are denoted by $n_g$, $n_F$, and $n_c$, respectively, the partial dispersion ratio $P_{g,F}$ is expressed by:

$$P_{g,F} = (n_g - n_F)/(n_F - n_C).$$

2. The zoom lens according to claim 1, wherein the positive lens in the first fourth lens unit satisfying the condition formulas (1), (2), and (3) include two positive lenses.

3. The zoom lens according to claim 1, wherein the following condition formula is satisfied, $$0.2 < Da/D4 < 0.35$$

where D4 denotes a thickness of the fourth lens unit, and Da denotes an air gap between the first fourth lens unit and the second fourth lens unit.

4. The zoom lens according to claim 1, wherein the following condition formula is satisfied, $$1.0 < f4p/f4 < 3.0$$

where f4 denotes a focal length of the fourth lens unit, f4p denotes a focal length of the positive lens satisfying the condition formulas (1), (2), and (3) in the first fourth lens unit.

5. The zoom lens according to claim 1 wherein the first fourth lens unit is configured to include, in order from the object side, a positive lens, a positive lens, a positive lens, a negative lens, and a positive lens, and the second fourth lens unit is configured to include, in order from the object side, a negative lens and a positive lens.

6. The zoom lens according to claim 5, wherein the following condition formula is satisfied, $$0.2 < (R1-R2)/(R1+R2) < 0.4$$

where R1 denotes a radius of curvature of a first surface of the positive lens arranged closest to the object side in the first fourth lens unit, and R2 denotes a radius of curvature of the negative lens in the second fourth lens unit.

7. The zoom lens according to claim 1, wherein the following condition formula is satisfied, $$0.2 < D4b/D4a < 0.5$$

where D4a denotes a thickness of the first fourth lens unit, and D4b denotes a thickness of the second fourth lens unit.

8. The zoom lens according to claim 1, wherein the following condition formula is satisfied, $$0.10 < f4/ft < 0.25$$

where f4 denotes a focal length of the fourth lens unit, and ft denotes a focal length of the entire system at a long focal end.

9. A camera comprising a photographing optical system having the zoom lens according to claim 1.

10. A portable information device comprising a photographing optical system having the zoom lens according to claim 1.

11. A zoom lens comprising, in order from an object side,
a first lens unit having a positive refractive power;
a second lens unit having a negative refractive power;
a third lens unit having a negative refractive power; and
a fourth lens unit having a positive refractive power,
wherein, during a change of magnification from the short focal end to the long focal end, the first lens unit is stationary, the second lens unit is moved to an image side, the third lens unit is moved, and the fourth lens unit is stationary,
wherein the first lens unit is configured to include, in order from the object side, a first negative lens, a first positive lens, and a second positive lens,
wherein at least the second positive lens in the first lens unit satisfies the following condition formulas (1), (2), and (3),
wherein the first lens unit includes a diffraction plane and satisfies the following condition formula (4), $$1.40 < n_d < 1.65 \quad (1)$$

$$65.0 < v_d < 100.0 \quad (2)$$

$$0.015 < P_{g,F} - (-0.001802 \times v_d + 0.6483) < 0.060 \quad (3)$$

$$50 < fdoe/f1 < 200 \quad (4)$$

where $n_d$ denotes a refractive index of the second positive lens, $v_d$ denotes an Abbe number of the second positive lens, $P_{g,F}$ denotes a partial dispersion ratio of the second positive lens, fdoe is a focal length of the diffraction plane, and f1 denotes a focal length of the first lens unit, and wherein $P_{g,F} = (n_g - n_F)/(n_F - n_c)$ where $n_g$, $n_F$, and $n_c$ denote refractive indexes of g-line, F-line, and c-line of the second positive lens, respectively.

12. The zoom lens according to claim 11, wherein only the second positive lens in the first lens unit satisfies the condition formulas (1), (2), and (3).

13. The zoom lens according to claim 11, wherein the following condition formula is satisfied, $$0.5 < f1/ft < 0.9$$

where f1 denotes the focal length of the first lens unit, and ft denotes a focal length of the entire system at a long focal end.

14. The zoom lens according to claim 11, wherein the following condition formulas are satisfied, $$-2.5 < f11/f1 < -1.0$$

$$0.5 < |f12/f1| < 1.5$$

$$1.0 < f13/f1 < 3.0$$

where f1 denotes the focal length of the first lens unit, f11 denotes a focal length of the first negative lens of the first lens unit, f12 denotes a focal length of the first positive lens of the first lens unit, and f13 denotes a focal length of the second positive lens of first lens unit.

15. The zoom lens according to claim 11, wherein the following condition formula is satisfied, $$0.15 < D1/ft < 0.25$$

where D1 denotes a thickness of the first lens unit, and ft denotes a focal length of the entire system at a long focal end.

16. The zoom lens according to claim 11,
wherein the fourth lens unit is configured to include a first fourth lens unit which is arranged at the object side from a position having the largest interval in the fourth lens unit and a second fourth lens unit which is arranged at the image side,
wherein the first fourth lens unit is configured to include, in order from the object side, a positive lens, a positive lens, a positive lens, a negative lens, and a positive lens, and the second fourth lens unit is configured to include, in order from the object side, a negative lens and a positive lens.

17. The zoom lens according to claim 11,
wherein the fourth lens unit is configured to include the first fourth lens unit which is arranged at the object side from a position having the largest interval in the fourth lens unit and the second fourth lens unit which is arranged at the image side, and
wherein only two positive lenses of the positive lenses in the first fourth lens unit satisfy the condition formulas (1), (2), and (3).

18. The zoom lens according to claim 11, wherein the following condition formula is satisfied, $$0.10 < f4/ft < 0.25$$

where f4 denotes a focal length of the fourth lens unit, and ft denotes a focal length of the entire system at a long focal end.

19. A camera comprising a photographing optical system having the zoom lens according to claim 11.

20. A portable information device comprising a photographing optical system having the zoom lens according to claim 11.

* * * * *